(12) United States Patent
Schadow et al.

(10) Patent No.: US 11,784,497 B2
(45) Date of Patent: Oct. 10, 2023

(54) POWER SUPPLY DEVICE FOR CHARGING AT LEAST ONE ELECTRICAL UNIT

(71) Applicant: Robert Bosch GmbH, Stuttgart (DE)

(72) Inventors: Joachim Schadow, Stuttgart (DE); Joern Stock, Tuntenhausen (DE)

(73) Assignee: Robert Bosch GmbH, Stuttgart (DE)

( * ) Notice: Subject to any disclaimer, the term of this patent is extended or adjusted under 35 U.S.C. 154(b) by 228 days.

(21) Appl. No.: 17/298,096

(22) PCT Filed: Nov. 8, 2019

(86) PCT No.: PCT/EP2019/080675
§ 371 (c)(1),
(2) Date: May 28, 2021

(87) PCT Pub. No.: WO2020/108955
PCT Pub. Date: Jun. 4, 2020

(65) Prior Publication Data
US 2022/0037895 A1     Feb. 3, 2022

(30) Foreign Application Priority Data
Nov. 30, 2018    (DE) .................. 10 2018 220 674.0

(51) Int. Cl.
   *H01M 10/44*     (2006.01)
   *H01M 10/46*     (2006.01)
   *H02J 7/00*       (2006.01)

(52) U.S. Cl.
CPC ........ *H02J 7/00032* (2020.01); *H02J 7/0042* (2013.01); *H02J 7/0047* (2013.01)

(58) Field of Classification Search
CPC ..... H02J 7/0042; H02J 7/0047; H02J 7/00032
(Continued)

(56) References Cited

U.S. PATENT DOCUMENTS

2007/0123303 A1    5/2007   Book et al.
2014/0095915 A1    4/2014   Hitchcock et al.
(Continued)

FOREIGN PATENT DOCUMENTS

DE    10 2011 005 646 A1    9/2012
DE    10 2013 208 834 A1    11/2014
(Continued)

OTHER PUBLICATIONS

Google translation of WO2014048463A1 (Apr. 2014) (Year: 2014).*
(Continued)

*Primary Examiner* — Edward Tso
(74) *Attorney, Agent, or Firm* — Maginot, Moore & Beck LLP

(57) ABSTRACT

A power supply device, in particular a charging apparatus, includes at least one housing unit and at least one interface unit, which is arranged at the housing unit, and has the purpose of coupling electrically to at least one electrical unit, in particular to a rechargeable battery pack. The power supply device further includes at least one real-time operating system-capable, in particular multitasking-capable, open-loop or closed-loop control unit which is configured to automatically perform actions, in particular to provide at least one set of data to the electrical unit, in accordance with an evaluation of, in particular, item information of the electrical unit not related to charging.

19 Claims, 10 Drawing Sheets

(58) Field of Classification Search
USPC .................. 320/106, 107, 110, 114, 137
See application file for complete search history.

(56) References Cited

U.S. PATENT DOCUMENTS

2019/0033395 A1* 1/2019 Karner ............. G06Q 10/06315
2021/0083506 A1* 3/2021 Rao ..................... G01R 21/06

FOREIGN PATENT DOCUMENTS

| EP | 1 145 402 B1 | 3/2009 | |
| EP | 2871748 A1 * | 5/2015 | ............ H02J 7/0027 |
| JP | 2009-257953 A | 11/2009 | |
| JP | 2009-273234 A | 11/2009 | |
| JP | 2011-61893 A | 3/2011 | |
| JP | 2014-529320 A | 11/2014 | |
| JP | 2016-13588 A | 1/2016 | |
| JP | 2017-62556 A | 3/2017 | |
| WO | 2014/048463 A1 | 4/2014 | |

OTHER PUBLICATIONS

International Search Report corresponding to PCT Application No. PCT/EP2019/080675, dated Feb. 3, 2020 (German and English language document) (6 pages).

\* cited by examiner

POWER SUPPLY DEVICE FOR CHARGING AT LEAST ONE ELECTRICAL UNIT

This application is a 35 U.S.C. § 371 National Stage Application of PCT/EP2019/080675, filed on Nov. 8, 2019, which claims the benefit of priority to Serial No. DE 10 2018 220 674.0, filed on Nov. 30, 2018 in Germany, the disclosures of which are incorporated herein by reference in their entirety.

BACKGROUND

DE 10 2013 208 834 A1 has already proposed a power supply device, in particular a charger, having at least one housing unit and having at least one interface unit, arranged on the housing unit, for the purpose of electrical coupling to at least one electrical unit, in particular a battery pack. The power supply device disclosed in DE 10 2013 208 834 A1 is intended for data communication between a battery pack and a central body.

SUMMARY

The disclosure is based on a power supply device, in particular a charger, having at least one housing unit and having at least one interface unit, arranged on the housing unit, for the purpose of electrical coupling to at least one electrical unit, in particular a battery pack.

It is proposed that the power supply device comprises at least one realtime-operating-system-compatible, in particular multitasking-compatible, control or regulating unit that is set up to take an evaluation of, in particular non-charging-related, item information of the electrical unit as a basis for independently performing actions, in particular providing the electrical unit with at least one dataset.

The power supply device is preferably intended to supply electrical units with, in particular electrical, power. Preferably, the power supply device is in the form of a charger. Alternatively, it is conceivable for the power supply device to be in the form of a cable reel, in the form of a construction site distribution box, in the form of a construction power distributor, in the form of a generator or in the form of another power supply device that appears appropriate to a person skilled in the art. An electrical unit is preferably in the form of a battery pack, in particular in the form of a machine tool battery pack. Alternatively, an electrical unit can be in the form of a machine tool or in the form of another device that can be operated using electrical power, such as for example a laptop, a digital camera, a cellphone, or the like. "Intended" is intended to be understood to mean in particular specifically equipped and/or set up. "Set up" is intended to be understood to mean in particular specifically programmed and/or specifically designed. The circumstance that an object is intended or set up for a specific function is intended to be understood to mean in particular that the object fulfils and/or performs this specific function in at least one application and/or operating state.

The housing unit is preferably intended for accommodating a plurality of components of the power supply device, in particular the control or regulating unit. In particular, at least part of the housing unit is formed from a plastic, from a metal, from a composite material, or the like. At least sections of the interface unit are preferably arranged on an outer side of the housing unit. In particular, the interface unit is intended at least for the purpose of electrical, preferably electromechanical, coupling to the electrical unit. In particular, the interface unit can be at least substantially in the form of an interface unit, known to a person skilled in the art, for electromechanically coupling a battery pack. Preferably, the interface unit comprises at least one contact element for the purpose of electrical coupling to the electrical unit. Preferably, the interface unit, in particular at least one contact element of the interface unit, comprises an electrical and/or mechanical coding that is intended to allow merely coupling of electrical units that are intended for use with the power supply device. In particular, an electrical unit electrically coupled to the interface unit is able to be supplied, in particular able to be charged, with electrical power by the interface unit. Preferably, the interface unit has at least one fixing element, in particular latching element, that is intended for fixing, in particular latching, the electrical unit to the housing unit during a charging process for the electrical unit.

Preferably, the power supply device comprises at least one supply connection for connection to a power grid. In particular, the supply connection is intended for drawing electrical power from the power grid in order to supply power to further components of the power supply device and in order to charge electrical units. Alternatively or additionally, it is conceivable for the power supply device to comprise at least one energy storage unit intended for supplying power to at least the control or regulating unit independently of the system voltage. Preferably, the energy storage unit is in the form of an integrated storage battery, storage capacitor, or the like, which is in particular arranged inside the housing unit. Alternatively, it is conceivable for the energy storage unit to be in the form of an external battery pack that is in particular able to be coupled to the interface unit and/or to an additional power supply interface unit of the power supply device. The energy storage unit is in particular intended for independently supplying power to the components of the power supply device, in particular the control or regulating unit, a communication unit and sensors, for at least two weeks, preferably for at least two months, and particularly preferably for at least one year. In particular, the energy storage unit is intended for independently supplying power to the components of the power supply device for at least two weeks and for charging an electrical unit at least once, preferably for charging an electrical unit multiple times.

Preferably, the power supply device comprises at least one touch-sensitive operator unit, which is set up for, in particular biometry-dependent, operator control of the control or regulating unit. Preferably, the operator unit is arranged on the housing unit. Preferably, the operator unit is in the form of a touch-sensitive screen. Alternatively, it is conceivable for the operator unit to comprise touch-sensitive keys, to be in the form of a touchpad, or the like. In particular, the operator unit can be used to control, in particular to configure, functions, settings, or the like, of the control or regulating unit. Preferably, at least part of the operator unit is set up for operator control of the control or regulating unit on the basis of at least one biometric parameter, such as for example a fingerprint, an iris image, a voice recording, or the like. In particular, the operator unit can have at least one operator control element that is set up to capture a biometric parameter, such as for example a fingerprint scanner, an iris scanner, a voice recognition system, or the like. In particular, the operator unit is set up to allow operator control of the control or regulating unit only by authorized users. Preferably, the operator unit is set up for user guidance, in particular by means of displays, outputs of advice, or the like. As an alternative or in addition to the operator unit, it is conceivable for the control or regulating unit to be in remotely controllable form, for example by way of a cellphone or a tablet.

Preferably, the operator unit is set up to provide a user with advice concerning an update process for an electrical unit, in particular an electrical unit coupled to the interface unit. In particular, the operator unit is set up to provide a user with advice concerning a disabling of the electrical unit for an update, concerning an enabling of the electrical unit for an update, concerning an ongoing update process, in particular concerning progress of an ongoing update process, concerning successful conclusion of an update and/or concerning an unintentional interruption to the update process. Preferably, the operator unit, in particular in the form of a screen, is set up to provide advice in the form of a pictogram, in text form, in the form of a color code, or the like. Alternatively, it is conceivable for the operator unit to be set up to provide advice by means of light-emitting elements, in particular LEDs, of different color or by means of differently flashing light-emitting elements, in particular LEDs.

As an alternative or in addition to the power supply device, the electrical unit, in particular an electrical unit in the form of a machine tool, can preferably also have an operator unit. The operator unit of the electrical unit is preferably in a form at least substantially analogous to that of the operator unit of the power supply device. In particular, the operator unit of the electrical unit, as an alternative or in addition to the operator unit of the power supply device, is set up to output advice to a user, in particular concerning an update process for the electrical unit. The operator unit of the electrical unit may in particular be set up to haptically provide advice, for example by means of an active electronic switch, by means of a vibration motor, or the like. Preferably, for the purpose of haptic provision of advice, a drive motor of an electrical unit, in particular in the form of a machine tool, can form at least part of the operator unit. In particular, it is conceivable for an output of advice to be provided by means of at least one movement of the drive motor that is unsuitable for driving an insert tool, for example as a result of juddering of the drive motor, as a result of slow clockwise running of the drive motor, as a result of slow anticlockwise running of the drive motor, as a result of intermittent clockwise running of the drive motor, as a result of intermittent anticlockwise running of the drive motor, as a result of pulsed clockwise running of the drive motor, as a result of pulsed anticlockwise running of the drive motor, as a result of alternate clockwise running and anticlockwise running of the drive motor, or the like. In addition, an output of advice, in particular concerning an update process for the electrical unit, can preferably also be provided by a screen of an external device, such as for example a cellphone or a tablet.

A "control or regulating unit" is intended to be understood to mean in particular a unit having at least one control electronics unit. A "control electronics unit" is intended to be understood to mean in particular a unit having a processor unit and having a memory unit and also having an operating program stored in the memory unit. The memory unit of the control or regulating unit is preferably set up to at least temporarily store data that are to be evaluated and/or that have been evaluated, in particular item information. In particular, the memory unit of the control or regulating unit has a memory size of at least 512 kilobytes, preferably a memory size of at least 1 megabyte. Preferably, at least part of the control or regulating unit is in the form of a microcontroller or said control or regulating unit comprises at least one microcontroller. Preferably, the control or regulating unit has a processing power that allows operation of a realtime operating system by the control or regulating unit. In particular, the control or regulating unit is capable of being set up in particular to perform a plurality of tasks at least substantially simultaneously. Preferably, the control or regulating unit is set up for multiprocessing. "Multiprocessing" is intended to be understood to mean in particular genuinely simultaneous performance of a plurality of tasks. In particular, the control or regulating unit is set up at least for edge computing or for fog computing.

"Non-charging-related item information" is in particular information about the electrical unit or surroundings of the electrical unit that the electrical unit provides. Preferably, non-charging-related item information is independent of a charge, in particular of a state of charge and of a charging process, of the electrical unit. Preferably, item information of the electrical unit can be captured by sensors of the electrical unit and/or by sensors of units that are couplable to the electrical unit. By way of example, the electrical unit may be in the form of a battery pack that is couplable to a further electrical unit, which is in the form of a machine tool. The further electrical unit can in particular have at least one sensor, preferably a plurality of sensors, for capturing item information. Preferably, the further electrical unit can transmit captured item information to the electrical unit in the form of a battery pack, in particular to a memory unit of the electrical unit. In particular, the electrical unit can provide the control or regulating unit with the item information. Preferably, the electrical unit is set up to provide the control or regulating unit with item information by way of the interface unit. In particular, the interface unit is set up for, in particular bidirectional, data communication between an electrical unit and the control or regulating unit. Preferably, a data interchange between an electrical unit and the control or regulating unit can be performed by way of the same at least one contact element of the interface unit, by way of which the electrical unit can be supplied with electrical power.

Item information of the electrical unit can in particular be in the form of an operating temperature of the electrical unit, in the form of a speed of the drive unit of a machine tool, in the form of a type of an insert tool fitted to a machine tool, in the form of a force acting on the electrical unit, in particular operator force, impact force, or the like, in the form of an operating mode of the electrical unit, in the form of a surroundings parameter of the electrical unit, such as for example an ambient temperature, a humidity, an air pressure, or the like, or in the form of other item information that appears appropriate to a person skilled in the art.

The control or regulating unit is preferably set up to collect, process and condition item information of the electrical unit and/or to combine said item information with further information or parameters, in particular for the purpose of generating an increased amount of information in comparison with a sum of all item information of the electrical unit. The control or regulating unit is in particular set up to take an evaluation of item information of the electrical unit as a basis for independently performing actions, in particular at least substantially independently of an input from a user, a command from a central computing unit, such as for example a server, a cloud, or the like, a query with a central computing unit, or the like, and in particular in a state communicatively isolated from other control or regulating units, central computing units, or the like. The control or regulating unit is preferably set up to provide the electrical unit with at least one dataset, in particular by way of the interface unit, on the basis of an evaluation of the item information. Preferably, the control or regulating unit is set up to take an evaluation of the item information as a basis for independently generating the dataset, selecting said dataset from a plurality of stored datasets and/or requesting said dataset, for example from a central computing unit. The dataset can in particular be in the form of an operating-behavior-specific dataset, in the form of an update dataset or in the form of another dataset that appears appropriate to a person skilled in the art. An operating-behavior-specific dataset is in particular a dataset that is formed to automatically adapt operating parameters of an electrical unit. An update dataset is in particular a dataset that is formed to update an operating program, in particular a piece of firmware, of an electrical unit. As an alternative or in addition to providing a dataset, the control or regulating unit may be set up to take an evaluation of the item information as a basis for carrying out further actions, for example triggering an alarm, adapting transmission intervals of components connected to the control or regulating unit, outputting advice to a user, or the like.

The inventive configuration of the power supply device allows advantageously efficient and convenient data processing. Advantageously, a large amount of information for data can be generated. Advantageously, manual configuration of electrical units and a permanent communication connection for electrical units and/or the power supply device can be dispensed with. Advantageously, a power supply device that can be used in particular locally, flexibly, in particular at least substantially independently, can be provided.

In addition, it is proposed that the power supply device comprises at least one wireless communication unit, arranged at a fixed location on, in particular inside, the housing unit, by way of which the control or regulating unit is set up for a bidirectional realtime-independent data interchange with the electrical unit. The control or regulating unit is preferably set up for a bidirectional realtime-independent data interchange with the electrical unit by way of the wireless communication unit as an alternative or in addition to a bidirectional realtime independent data interchange with the electrical unit by way of the interface unit. A "bidirectional data interchange" is intended to be understood to mean in particular a, in particular simultaneous, data transmission from the control or regulating unit to the electrical unit and from the electrical unit to the control or regulating unit. A "realtime-independent data interchange" is intended to be understood to mean in particular a data interchange that can take place with staggered timing in relation to capture or generation of data that are to be interchanged. By way of example, item information can be captured during operation of a machine tool and transmitted in a subsequent charging mode of a battery pack of the machine tool. The wireless communication unit can in particular be in the form of a radio module, in the form of a Bluetooth module, in particular in the form of a Bluetooth Low Energy module, in the form of a WLAN module, in the form of an infrared module or in the form of another wireless communication unit that appears appropriate to a person skilled in the art. Preferably, the wireless communication unit is arranged at a fixed location on the housing unit, in particular so as to be detachable from the housing unit and/or further components of the power supply device only by using a tool. Preferably, the wireless communication unit is arranged inside the housing unit, in particular on the same circuit board as the control or regulating unit. Alternatively or additionally, it is conceivable for the power supply device to have at least one wireless communication unit that is detachably connectable to the housing unit, for example in the form of a plug-in module. As an alternative or in addition to a data interchange with the electrical unit, it is conceivable for the control or regulating unit to be set up to use the wireless communication unit for communication with an external unit, for example a tablet, a cellphone, or the like. Advantageously, a further possibility for data transmission can be provided. Advantageously, a power supply device that can be used flexibly, in particular independently of a charging process, can be provided.

Furthermore, it is proposed that the power supply device comprises at least one wireless communication unit, wherein the interface unit is in the form of an inductive interface unit that forms at least part of the communication unit. Preferably, the power supply device has the wireless communication unit, at least part of which is formed by the inductive interface unit, as an alternative or in addition to the wireless communication unit arranged at a fixed location on the housing unit. Preferably, the inductive interface unit is at least substantially in a form, in particular in respect of wireless power transmission, that is known to a person skilled in the art. Preferably, the inductive interface unit forms at least substantially the whole of a wireless communication unit. In particular, the inductive interface unit is set up for data transmission to the electrical unit and/or for data reception from the electrical unit in addition to power transmission to the electrical unit. Preferably, the control or regulating unit is set up to use the inductive interface unit for a bidirectional realtime-independent data interchange with the electrical unit. A power supply device that is advantageously improved further in respect of flexibility of a data transmission can be provided.

Furthermore, it is proposed that the interface unit is in the form of a multifunctional interface unit intended for electromechanical coupling to a plurality of different electrical units. In particular, the multifunctional interface unit is intended for electromechanical coupling to a plurality of different electrical units that have contact elements in different forms, contact elements in different arrangements and/or a different number of contact elements. In particular, the multifunctional interface unit has a plurality of different electromechanical interfaces. In particular, the different electromechanical interfaces can be arranged in the manner of a carousel. In particular, the multifunctional interface unit can be mounted on the housing unit so as to be able to rotate. In particular, a required electromechanical interface can be transferable to a position of use by means of a rotation of the multifunctional interface unit. Alternatively or additionally, it is conceivable for the multifunctional interface unit to comprise a plurality of different wired interfaces. In particular, at least sections of the interfaces arranged on cables can be in a form such that they are extendable from the housing unit. In particular, the interface unit can have retraction mechanisms that are intended for automatic retraction, preferably automatic retraction and automatic rolling-up, of the wired interfaces. Advantageously, a power supply device that can be used flexibly with a plurality of different electrical units can be provided.

Moreover, it is proposed that the power supply device comprises at least one internal sensor unit set up to capture surroundings parameters that are taken into consideration by the control or regulating unit when performing the independent actions or that are taken into consideration when evaluating, in particular non-charging-related, item information. The internal sensor unit is preferably arranged on, in particular inside, the housing unit. Preferably, at least part of the internal sensor unit is arranged on the same circuit board as the control or regulating unit. The internal sensor unit can in particular be in the form of a temperature sensor, in the form of a position sensor, in the form of an acceleration sensor, in the form of a magnetic field sensor, in the form of a humidity sensor, in the form of an air pressure sensor, in the form of a GNSS sensor (Global Navigation Satellite System sensor) or in the form of another internal sensor unit that appears appropriate to a person skilled in the art. Preferably, the internal sensor unit is set up to capture a temperature, an orientation, an acceleration, a magnetic field, a humidity, an air pressure, a navigation satellite signal or another surroundings parameter that appears appropriate to a person skilled in the art. The power supply device can in particular comprise a plurality of, in particular different, internal sensor units that are preferably set up to capture a plurality of different surroundings parameters. The internal sensor unit is preferably set up to provide the control or regulating unit with captured surroundings parameters. In particular, the control or regulating unit is set up to evaluate the surroundings parameters, in particular for the purpose of taking them into consideration when performing the independent actions and/or when evaluating, in particular non-charging-related, item information. Advantageously, a generable amount of information can be increased further.

In addition, it is proposed that the power supply device comprises at least one connection unit intended for connecting at least one external sensor unit to the control or regulating unit for data transmission purposes. An external sensor unit is preferably in a form such that it is separate from the housing unit, in particular is arranged at a physical distance from the housing unit. In respect of a further form of the external sensor unit, in particular in respect of surroundings parameters that are capturable by the external sensor unit, the external sensor unit is in a form at least substantially analogous to that of the internal sensor unit. The connection unit is preferably in the form of an electromechanical connection unit and/or in the form of a wireless connection unit. In particular, it is conceivable for the power supply device to have at least one electromechanical connection unit and at least one wireless connection unit. An electromechanical connection unit is preferably intended for electromechanical coupling to an external sensor unit, in particular on the housing unit of the power supply device. In particular, the electromechanical connection unit has at least one interface for the purpose of electromechanical coupling to the external sensor unit. The interface of the electromechanical connection unit can in particular be in the form of a proprietary interface or in the form of a standardized interface, such as for example a USB interface, an RS232 interface, a lightning interface, a USB cable, or the like. In particular, the electromechanical connection unit can be intended for supplying power to the external sensor unit. A wireless connection unit is preferably set up for wireless data interchange with an external sensor unit. In particular, the wireless connection unit can be in the form of a radio module, in the form of a Bluetooth module, in particular in the form of a Bluetooth Low Energy module, in the form of a WLAN module, in the form of an LORA module, in the form of an EnOcean module, in the form of an ANT module, in particular in the form of an ANT+ module, in the form of a ZWave module, in the form of a ZigBee module or in the form of another wireless connection unit that appears appropriate to a person skilled in the art. Advantageously, a power supply device that is flexibly connectable to external sensor units can be provided.

Furthermore, it is proposed that the connection unit is in a form such that it is connectable in series for the purpose of electromechanically connecting a plurality of external sensor units to the control or regulating unit. In particular, an electromechanical connection unit is in a form such that it is connectable in series for the purpose of electromechanically connecting a plurality of external sensor units to the control or regulating unit. In particular, multiple external sensor units are couplable in succession to a single interface of the connection unit connectable in series. Preferably, all external sensor units coupled to an interface of the connection unit connectable in series are connected to the control or regulating unit for data transmission purposes, in particular for the purpose of providing captured surroundings parameters. In particular, an external sensor unit is directly electromechanically couplable to the interface of the connection unit connectable in series. In particular, further external sensor units are indirectly connectable to the control or regulating unit for data transmission purposes by way of the external sensor unit that is directly electromechanically coupled to the interface of the connection unit connectable in series. Preferably, all external sensor units directly or indirectly coupled to the interface of the connection unit connectable in series can be supplied with electrical power by the connection unit connectable in series. Advantageously, flexible connection of a plurality of external sensor units to a single interface can be made possible.

Furthermore, it is proposed that the control or regulating unit is set up to combine and evaluate surroundings parameters captured by the internal sensor unit and/or by the external sensor unit with item information of the electrical unit. In particular, the control or regulating unit is set up to compress information by combining surroundings parameters captured by the internal sensor unit and/or by the external sensor unit with item information of the electrical unit. Preferably, the control or regulating unit is set up to combine and evaluate the surroundings parameters with the item information for the purpose of independent performance of an action. By way of example, it is conceivable for the control or regulating unit to identify a possible theft of the electrical unit by combining and evaluating a detected vibration, a variation in air pressure and a movement of the electrical unit, in particular outside a defined period of use, and to trigger an alarm. Advantageously, a high density of information can be generated.

Moreover, it is proposed that the control or regulating unit is set up to take an evaluation of the surroundings parameters and/or of the item information as a basis for generating at least one operating-behavior-specific dataset and providing said dataset to the electrical unit. Preferably, the operating-behavior-specific dataset is set up to influence an operating behavior of the electrical unit and/or of a further electrical unit coupled to the electrical unit. In particular, the operating-behavior-specific dataset is set up to adapt preset operating parameters of the electrical unit and/or of the further electrical unit coupled to the electrical unit. By way of illustration, an operating parameter of an electrical unit in the form of a machine tool can be in the form of an admissible speed range, in the form of an admissible operating temperature range, in the form of an admissible data usage period, or the like. In particular, it is conceivable for the control or regulating unit to be set up to take an evaluation of the surroundings parameters and/or of the item information as a basis for generating an operating-behavior-specific dataset for an electrical unit in the form of a machine tool. The control or regulating unit can in particular provide the operating-behavior-specific dataset for the electrical unit in the form of a machine tool to a further electrical unit in the form of a battery pack, and the further electrical unit can in particular provide the electrical unit in the form of a machine tool with the operating-behavior-specific dataset. By way of example, it is conceivable for the control or regulating unit to be set up to take a height ascertained on the basis of an air pressure, to take a detected temperature and to take a detected maximum continuous operating period of an electrical unit as a basis for generating an operating-behavior-specific dataset and providing said dataset to the electrical unit, which is in particular set up to adapt an admissible speed range of the machine tool such that operation of the machine tool over the detected maximum continuous operating period under the detected ambient conditions is possible at least substantially perfectly. By way of example, it is conceivable for the control or regulating unit to be set up to take a height ascertained on the basis of an air pressure and to take a detected speed range of a machine tool in the form of a hammer drill as a basis for generating an operating-behavior-specific dataset and providing said dataset to the electrical unit, which is in particular set up to adapt an operating behavior of a pneumatic system of the electrical unit such that efficient operation of the electrical unit is made possible under the detected conditions. Advantageously, manual configuration of electrical units can be dispensed with. Advantageously, convenient setting of operating parameters of electrical units can be made possible.

In addition, the disclosure is based on a power supply system having at least one power supply device, in particular a power supply device according to the disclosure, and having at least one electrical unit, in particular a battery pack.

It is proposed that the electrical unit comprises at least one computing unit set up to carry out a plausibility check on datasets received from the power supply device. A "computing unit" is intended to be understood to mean in particular a controller having a processor, a memory unit and/or an operating, control and/or calculation program stored in the memory unit. Preferably, the memory unit of the computing unit has a memory size sufficient for storing at least one dataset of item information. Preferably, the memory unit of the computing unit has a database structure for data management. In particular, the computing unit, to check the plausibility of datasets received from the power supply device, is set up to check whether and which of the transmitted datasets are relevant to the electrical unit, whether specific datasets are intended for forwarding to a further electrical unit, whether a transmitted dataset is already present in the memory unit of the electrical unit, whether a dataset is current, or the like. Preferably, the computing unit is set up to subject only datasets ascertained as plausible to further processing. Preferably, the computing unit is set up to erase implausible datasets. Advantageously, a power supply system that allows convenient automated data transmission with efficient memory use can be provided.

Furthermore, it is proposed that the computing unit is set up to provide the power supply device with at least one dataset of item information that comprises at least one electrical-unit-specific identification parameter and at least one message number. Preferably, the electrical unit and/or a further electrical unit coupled to the electrical unit comprises at least one sensor unit for capturing item information and/or surroundings parameters of the electrical unit. Preferably, the computing unit is set up to generate the dataset of item information, in particular on the basis of item information and/or surroundings parameters captured by the electrical unit and/or at least one further electrical unit coupled to the electrical unit. In particular, the computing unit is set up to buffer-store the dataset of item information in the memory unit until said dataset is transmitted to the power supply device. A dataset of item information preferably comprises an electrical-unit-specific identification parameter, a message number and the item information. An electrical-unit-specific identification parameter is in particular a unique parameter that is assigned to a single electrical unit and on the basis of which the electrical unit is uniquely identifiable. The electrical-unit-specific identification parameter comprises in particular at least one serial number of the electrical unit, preferably a bare tool number of the electrical unit and a serial number of the electrical unit. The message number is in particular in the form of a consecutive number. The message number is in particular intended for putting a dataset of an electrical unit in a chronological order in relation to all other datasets of the same electrical unit. The higher the message number of a dataset, the more recent in particular a time of generation of the dataset. Advantageously, a clear association and an efficient evaluation of item information can be achieved.

Furthermore, it is proposed that the power supply device comprises at least one locking unit, in particular controllable or regulable by the control or regulating unit, that is intended for fixing the electrical unit to the interface unit, in particular during a data interchange, in an at least substantially theft-proof fashion. Preferably, the locking unit comprises at least one locking element, such as for example a locking pin, a locking clip, a magnetic lock, or the like, for fixing the electrical unit to the interface unit in an at least substantially theft-proof fashion. In particular, the locking unit comprises at least one lock for locking the locking element in a fixing position in which the locking element in particular fixes the electrical unit to the interface unit. Preferably, the locking unit, in particular the lock, is electronically operable, in particular by way of the control or regulating unit, for example by means of a cellphone, by means of a key card, by means of an electronic code, or the like. Preferably, the locking unit is intended for fixing the electrical unit to the interface unit at least until a data interchange between the control or regulating unit and the electrical unit has concluded. Alternatively or additionally, it is conceivable for the locking unit, in particular the lock of the locking unit, to be mechanically operable, for example by means of a mechanical key or by means of a numerical code.

The power supply system can preferably have at least one adapter unit set up for electromechanically coupling an electrical unit, in particular a machine tool, to the power supply device. In particular, the interface unit of the power supply device is in a form corresponding to that of interfaces of an electrical unit in the form of a battery pack. Preferably, the adapter unit has interfaces, in each case in a form analogous to that of the interfaces of the electrical unit in the form of a battery pack, on a first side of a housing of the adapter unit and on a second side of the housing, which is in particular remote from the first side of the housing. The adapter unit is preferably electromechanically couplable to an electrical unit in the form of a machine tool on the first side of the housing and to the interface unit of the power supply device on the second side of the housing. The adapter unit is in particular set up to electromechanically connect an electrical unit in the form of a machine tool to the power supply device without using a battery pack. Preferably, the adapter unit has at least one electronics unit set up to ensure at least substantially error-free data transmission and/or power transmission between the electrical unit in the form of a machine tool and the power supply device, in particular the control or regulating unit.

Preferably, the power supply device comprises at least one security unit intended for fastening the housing unit at least substantially at a fixed location, in particular in an at least substantially theft-proof fashion. In particular, the security unit is arranged on the housing unit, preferably in a form integral with the housing unit. "Integral" is intended to be understood to mean in particular formed in one piece. Preferably, this one piece is produced from a single blank, a mass and/or a casting, particularly preferably using an injection-molding process, in particular a single- and/or multicomponent injection-molding process. The security unit can in particular be in the form of a security loop, in the form of a Kensington lock or in the form of another security unit that appears appropriate to a person skilled in the art, in particular configured for use with a security cable, a padlock, or the like. Preferably, the housing unit is fastenable by means of the security unit at least substantially at a fixed location in a workshop, on a construction site, in a vehicle, or the like. Advantageously, a secure data interchange between the control or regulating unit and the electrical unit can be made possible. Advantageously, an at least substantially interruption-free and complete data interchange between the control or regulating unit and the electrical unit can be made possible.

Moreover, the disclosure is based on a power supply system, in particular a power supply system according to the disclosure, having at least one power supply device, in particular a power supply device according to the disclosure, and having at least one central computing unit.

It is proposed that the central computing unit is set up to provide the power supply device with at least one update dataset for at least one electrical unit, which update dataset comprises at least one subject parameter and at least one message number. The central computing unit can in particular be in the form of a server, in particular in the form of a cloud server, in the form of a backend or in the form of another central computing unit that appears appropriate to a person skilled in the art. In particular, the central computing unit is arranged at a physical distance from the power supply device, for example in a company headquarters, in a computer center, or the like. The power supply device, in particular the control or regulating unit, is preferably set up for bidirectional communication with the central computing unit. In particular, the power supply device comprises at least one further communication unit for communicating with the central computing unit. Preferably, the further communication unit is in the form of a wireless communication unit. In particular, the further communication unit can be in the form of an LPWAN module (low-power wide-area network module), for example in the form of an NB IOT module, in the form of an LTE CAT M1 module, in the form of an LORA module, in the form of a Sigfox module, or the like, in the form of a GSM module, in the form of an LTE module or in the form of another wireless communication unit that appears appropriate to a person skilled in the art. Alternatively or additionally, it is conceivable for the further communication unit to be in the form of a wired communication unit, for example in the form of an LAN interface or in the form of a Powerline interface.

Preferably, the central computing unit, as an alternative or in addition to the control or regulating unit, is set up to combine datasets, to evaluate datasets and/or to independently perform actions. By way of example, the central computing unit can be set up to take an evaluation of surroundings parameters and/or item information as a basis for generating at least one operating-behavior-specific dataset and providing said dataset to the control or regulating unit, which is in particular set up to provide the operating-behavior-specific dataset to an electrical unit. The central computing unit is preferably set up to provide the control or regulating unit with at least one update dataset, said control or regulating unit in particular being set up to provide the update dataset to at least one electrical unit. Alternatively or additionally, it is conceivable for the central computing unit to be set up to provide the update dataset directly to at least one electrical unit, in particular by way of a communication connection to the electrical unit. An update dataset can in particular be in the form of a family-specific update dataset or in the form of an electrical-unit-specific update dataset. A family-specific update dataset is in particular an update dataset that is intended to be provided to a plurality of electrical units that in particular belong to a specific family of electrical units. By way of illustration, a family of electrical units can be in the form of a family comprising handheld machine tools, in the form of a family comprising drills, in the form of a family comprising 18 V storage batteries, etc., or else in the form of a family comprising all electrical units. An electrical-unit-specific update dataset is in particular an update dataset that is intended to be provided to a single electrical unit. A family-specific update dataset in particular comprises at least one subject parameter, at least one message number, at least one family-specific identification parameter and data that are to be provided. An electrical-unit-specific update dataset in particular comprises at least one subject parameter, at least one message number, at least one family-specific identification parameter, at least one electrical-unit-specific identification parameter, in particular a serial number of an electrical unit, and data that are to be provided. A subject parameter in particular describes at least a content of a dataset, for example an update to a specific new firmware version of an electrical unit. A family-specific identification parameter is in particular a parameter that is assigned to a family of electrical units and on the basis of which the family of electrical units is uniquely identifiable, for example a bare tool number.

An update dataset, in particular a family-specific update dataset and/or an electrical-unit-specific update dataset, can preferably be in the form of a standard update dataset, in the form of a function update dataset or in the form of a security update dataset. A standard update dataset is in particular formed to update an operating program, in particular a piece of firmware, of an electrical unit in respect of minor corrections, in particular in order to correct errors in the operating program. A function update dataset is in particular formed to update and/or extend existing functions of an operating program, in particular a piece of firmware, of an electrical unit, to add new functions in the operating program, to enable available, previously unusable functions and/or to allow the operating program to access information, in particular individual pieces of information and/or evaluated information, in particular by providing at least one licence key. In particular, the central computing unit can be set up to provide a function update dataset on the basis of a licence for the function update dataset being purchased by a user, on the basis of a subscription for function update datasets being taken out by a user, on the basis of an advertising campaign, in particular for the function update dataset, or the like. A security update dataset is in particular formed to update an operating program, in particular a piece of firmware, of an electrical unit in respect of security-critical errors in the operating program, for example bugs, to update available functions of the operating program in terms of security, for example as a result of a change and/or extension to technical and/or legal standards, and/or to add security functions in the operating program, for example as a result of a change and/or extension to technical and/or legal standards. Advantageously, automatic assignment and convenient processing of update datasets can be made possible.

In addition, the disclosure is based on a method for operating a power supply system according to the disclosure.

It is proposed that at least one method step involves a, in particular technical, compatibility of at least one electrical unit with at least one dataset to be transmitted to the electrical unit being checked. In particular, a compatibility of software contained in the dataset to be transmitted with hardware of the electrical unit and/or firmware of the electrical unit is checked. In particular, a check is performed to determine whether an operating program contained in the dataset is operable by an operating electronics unit of the electrical unit. In particular, a compatibility of a software version contained in the dataset to be transmitted with a firmware version of the electrical unit is checked. In particular, a compatibility of software contained in the dataset to be transmitted with firmware of the electrical unit is checked on the basis of a build number of the software and/or of the firmware. In particular, a compatibility of software contained in the dataset to be transmitted with firmware of the electrical unit is checked on the basis of specific software components already contained in the firmware of the electrical unit. In particular, a compatibility of software contained in the dataset to be transmitted with firmware of the electrical unit is checked on the basis of software components already combined with one another in the firmware of the electrical unit. Preferably, a compatibility of software contained in the dataset to be transmitted with hardware and/or firmware of a communication unit of the electrical unit, which communication unit is set up to receive the dataset, is checked. By way of illustration, it is conceivable for a compatibility of software contained in a dataset that is to be transmitted with firmware of an electrical unit to require the presence of specific software components in the firmware of the electrical unit. Preferably, the presence of the specific software components in the firmware of the electrical unit is checked before the dataset is transmitted. In particular, transmission of the dataset is enabled on the basis of the presence of the specific software components in the firmware of the electrical unit. By way of illustration, it is conceivable for a dataset that is to be transmitted to be in the form of an update dataset that in particular contains a firmware update for the electrical unit. In particular, it is conceivable for operability of the firmware update to require software components of preceding firmware updates in the firmware of an electrical unit. Preferably, before the update dataset is transmitted, the presence of the software components of the preceding firmware updates in the firmware of the electrical unit is checked. In particular, transmission of the dataset is enabled on the basis of the presence of the software components of the preceding firmware updates in the firmware of the electrical unit. In particular, it is conceivable for the absence of the software components of the preceding firmware updates in the firmware of the electrical unit before the update dataset is transmitted to be taken as a basis for transmitting at least one further update dataset that contains the preceding firmware updates.

Preferably, a, in particular technical, compatibility of a dataset to be transmitted with a power supply device and/or with another device, for example a cellphone or a tablet, set up to transmit the dataset to the electrical unit is checked. In particular, a compatibility of a dataset to be transmitted with hardware of the power supply device and/or with hardware of the other device set up to transmit the dataset to the electrical unit is checked. In particular, a capacity of a memory unit of the power supply device and/or of the other device for buffer-storing the dataset to be transmitted is checked. Preferably, a hardware version of all devices and communication interfaces involved in transmitting a dataset is checked. In particular, the hardware versions of the devices and communication interfaces are compared with a combination table that preferably comprises all compatible combinations of hardware versions. Preferably, transmission of the dataset is enabled on the basis of a comparison of the hardware versions of the devices and the communication interfaces with the combination table. Preferably, the, in particular technical, compatibility of the electrical unit with the dataset to be transmitted to the electrical unit is checked by the control or regulating unit of the power supply device, by the computing unit of the electrical unit and/or by the central computing unit. Advantageously, correct operation of electrical units after a data transmission can be made possible.

Preferably, at least one method step involves at least one authorization to transmit at least one dataset to the electrical unit being checked. In particular, at least one role-related authorization, at least one electrical-unit-related authorization, at least one application-related authorization, at least one service-related authorization, at least one person-related authorization, at least one customer-related authorization, at least one reward-dependent authorization, least one trade-related authorization, at least one location-dependent authorization, at least one time-dependent authorization and/or at least one status-related authorization to transmit at least one dataset to the electrical unit is/are checked. A role-related authorization can in particular be in the form of a colleague-related authorization or in the form of an administration-related authorization. A colleague-related authorization is in particular an authorization of a colleague, for example a storeperson (warehouse keeper), a company boss, a general manager, a unit leader, an employee, a worker, a group manager, a construction site manager, or the like, of a company that in particular has the electrical unit. In particular, different colleagues can have different authorizations. By way of illustration, it is conceivable for an authorization to transmit an update dataset to the electrical unit to be checked and for the update dataset to be transmitted only if a colleague-related authorization of a storeperson is available, for example to ensure transmission outside working hours. An administration-related authorization is in particular an authorization of a third party, such as for example a dealer, a service provider, or the like.

An electrical-unit-related authorization in particular indicates whether an electrical unit or a family of electrical units is authorized to receive a dataset. Preferably, an electrical-unit-related authorization is checked on the basis of a family of electrical units, on the basis of a bare tool number of the electrical unit and/or on the basis of a serial number of the electrical unit. By way of illustration, it is conceivable for a dataset that is to be provided for a specific family of electrical units to be provided in a manner tied to an electrical-unit-related authorization in respect of the specific family of electrical units. By way of illustration, it is conceivable for a dataset to b e provided in a manner tied to an electrical-unit-related authorization that is dependent on a specific bare tool number. By way of illustration, it is conceivable for a serial number of an electrical unit to be used to check an electrical-unit related authorization of the electrical unit to receive a purchased update dataset. Alternatively or additionally, it is conceivable for a dataset that is to be transmitted to have an electrical-unit-related authorization, for example to be encrypted with a serial number of a specific electrical unit.

An application-related authorization is in particular an authorization that is dependent on an application for which the electrical unit is intended, for example polishing, grinding, separating, drilling, hammering, or the like. Preferably, the electrical unit has an, in particular digital, application identifier that comprises possible applications of the electrical unit. Preferably, before a dataset is transmitted, the application identifier of the electrical unit is checked and the dataset is transmitted only if relevant to possible applications of the electrical unit. Preferably, the application identifier is adaptable by a user by means of an update dataset and/or manually, in particular to enable possible applications of the electrical unit. A service-related authorization is in particular an authorization that is dependent on a booking of a, in particular paid, service. By way of illustration, it is conceivable for a service-related authorization to be checked and for transmission of an update dataset to be enabled if a service that can be enabled by the update dataset has been paid for, for transmission of an update dataset to be enabled if a further service has been paid for, and/or for transmission of an update dataset to be enabled if a specific function in an operating program of the electrical unit is enabled.

A person-related authorization is in particular an authorization that applies to a specific, in particular natural or legal, person. Preferably, a person-related authorization is checked on the basis of an authorization list containing persons authorized to receive a dataset and/or on the basis of a block list containing persons blocked for receiving a dataset. In particular, persons are removed from the authorization list and/or placed on the block list on the basis of abnormal behavior in respect of electrical units and/or datasets. Abnormal behavior in respect of an electrical unit and/or a dataset can in particular be in the form of inappropriate handling of the electrical unit, in the form of late payment behavior, in the form of failure to return hired electrical units, in the form of failure to observe maintenance schedules for an electrical unit or in the form of other abnormal behavior in respect of an electrical unit and/or a dataset that appears appropriate to a person skilled in the art. Preferably, persons are removed from the block list and/or placed on the authorization list on the basis of correct behavior in respect of electrical units and/or datasets. Correct behavior in respect of an electrical unit and/or a dataset can in particular be in the form of timely payment behavior, in the form of purchase of a plurality of paid services, in the form of appropriate handling of the electrical unit or in the form of other correct behavior in respect of an electrical unit and/or a dataset that appears appropriate to a person skilled in the art.

A customer-related authorization is in particular dependent on a type of customer that purchases at least part of a power supply system, in particular at least one electrical unit. A customer-related authorization can in particular be in the form of an original-equipment-supplier-related authorization or in the form of a direct-customer-related authorization. An original-equipment-supplier-related authorization is in particular dependent on an original equipment supplier that in particular purchases at least part of the power supply system and sells it on under its own name. By way of illustration, it is conceivable for transmission of specific datasets to be enabled merely for original equipment suppliers that purchase the datasets separately. By way of illustration, it is conceivable for transmission of specific datasets to be blocked for competitor original equipment suppliers that are in particular in the form of competitors of a manufacturer of the power supply system. A direct-customer-related authorization is in particular dependent on a direct customer of a manufacturer of the power supply system that purchases at least part of the power supply system directly from the manufacturer of the power supply system. A direct customer can preferably be in the form of a dealer with a specific share of revenue, in the form of a strategic partner of the manufacturer, in the form of a company customer with a specific share of revenue, in the form of a large customer, for example a company having at least 51 employees, in the form of a medium-sized customer, for example a company having between 10 and 50 employees, or in the form of a small customer, for example a company having between 1 employee and 9 employees. Preferably, a customer-related authorization can be used to provide datasets tailored to specific customer groups. By way of illustration, it is conceivable for a dealer to be authorized to transmit datasets that allow the dealer to view specific data from electrical units of customers of the dealer.

A reward-dependent authorization is in particular an authorization that is allocated as a reward for a specific behavior or during an advertising campaign. In particular, reward-dependent authorizations can be allocated as a reward for frequent purchase of parts of a power supply system, for frequent booking of services, for traceably, in particular measurably, appropriate handling of electrical units, or the like. By way of illustration, it is conceivable for, upwards of a specific turnover level of a user, for example purchase of electrical units with a goods value of at least €500, a reward-dependent authorization to be allocated to the user that allows free transmission of an otherwise chargeable update dataset. By way of illustration, it is conceivable for a user to provide item information for electrical units that are used to a service provider for evaluation. On the basis of an evaluation of the item information, it is in particular possible for reward-dependent authorizations to be allocated to the user. By way of example, a reward-dependent authorization allowing transmission of an update dataset that is in particular formed to update an operating program of the electrical unit such that a brief overload of the electrical unit is made possible can be allocated to a user that—ascertained on the basis of item information—handles an electrical unit appropriately. A trade-related authorization is in particular an authorization that is dependent on a trade in which an electrical unit is employed. A trade can in particular be in the form of window construction, in the form of carpentry, in the form of kitchen construction, in the form of tiling or in the form of another trade that appears appropriate to a person skilled in the art. Preferably, trade-related authorization can be taken as a basis for providing datasets specifically coordinated with a trade.

A cation-dependent authorization is in particular dependent on a location, in particular a region, at/in which a power supply system, in particular an electrical unit, is used. Preferably, a location-dependent authorization is dependent on conditions prevailing at a location, in particular on ambient conditions and/or legal conditions.

By way of illustration, it is conceivable for a location-dependent authorization to be in a different form in regions with a high average ambient temperature than in regions with a low average ambient temperature. By way of illustration, it is conceivable for different location-dependent authorizations to be allocated in different countries on the basis of a legislation in the countries. Preferably, a location-dependent authorization is dependent on services provided at a location. By way of illustration, it is conceivable for location-dependent authorizations at a specific location to be allocated that merely allow transmission of datasets related to services provided at that location. A time-dependent authorization is in particular an authorization that is dependent on specific times related to a power supply system, in particular to an electrical unit. A time-dependent authorization can in particular be dependent on daily working hours of a user, on a season, on a time in which an electrical unit is used, on a time in which an electrical unit is not used or on another time that appears appropriate to a person skilled in the art.

A status-related authorization is in particular an authorization that is dependent on a status of a power supply system, in particular an electrical unit, on a status of a user and/or on a status of devices related to the power supply system, in particular to the electrical unit. A status can in particular be in the form of a state of charge of the power supply device, in the form of a state of charge of the electrical unit, in the form of a state of charge of a battery-operated communication unit, in the form of a state of charge of a cellphone, in the form of a state of charge, in particular in the form of a remaining range, of a vehicle in which in particular the power supply device and/or the electrical unit are/is arranged, in the form of a time of day, in the form of a country of residence, in the form of an available data volume, in the form of working hours or leisure time of a user, in the form of a vacation of a user or in the form of another status that appears appropriate to a person skilled in the art. Preferably, a plurality of, in particular different, authorizations to transmit at least one dataset are checked, in particular in an arbitrary or predefined order. Preferably, a combination of a, in particular technical, compatibility of an electrical unit with a dataset to be transmitted to the electrical unit with at least one authorization to transmit the dataset is checked.

Furthermore, it is proposed that at least one method step involves an evaluation of at least one dataset provided by the power supply device, by the electrical, unit and/or by the central computing unit being taken as a basis for ascertaining a probable end of life of the electrical unit and offering a user at least one replacement service for the electrical unit. Preferably, a probable end of life of the electrical unit is ascertained by evaluating at least one dataset that comprises at least item information and/or surroundings parameters. Preferably, a probable end of life of the electrical unit is ascertained by evaluating a plurality of datasets, in particular a plurality of datasets captured at different times. Preferably, a probable end of life of the electrical unit is ascertained by the control or regulating unit of the power supply device, by the central computing unit and/or by the computing unit of the electrical unit. A probable end of life of an electrical unit is in particular in the form of a time at which the electrical unit will probably be faulty. A replacement service for an electrical unit is in particular in the form of a service that involves the electrical unit being replaced with a new, in particular operational, electrical unit, preferably before or when the probable end of life of the electrical unit is reached. Advantageously, an evaluation of data allows user convenience to be increased. Advantageously, fault-based work interruptions can be minimized.

Additionally, it is proposed that at least one method step involves an evaluation of at least one dataset provided by the power supply device, by the electrical unit and/or by the central computing unit being taken as a basis for creating at least one statement of usage costs. Preferably, a statement of operating costs is created by evaluating at least one dataset that comprises at least item information and/or surroundings parameters. Preferably, a statement of operating costs is created by evaluating a plurality of datasets, in particular a plurality of datasets captured at different times. Preferably, a statement of operating costs is ascertained by the control or regulating unit of the power supply device, by the central computing unit and/or by the computing unit of the electrical unit. A statement of operating costs is in particular a list of costs incurred through use of an electrical unit or of a family of electrical units, for example on the basis of a detected wear, a detected period of use, use under specific detected ambient conditions, or the like. Alternatively or additionally, it is conceivable for at least one method step to involve an evaluation of at least one dataset provided by the power supply device, by the electrical unit and/or by the central computing unit being taken as a basis for offering and/or carrying out at least one inventory optimization for electrical units, offering at least one training for use, offering at least one more powerful electrical unit, or the like. Advantageously, automated creation of a statement of operating costs in a convenient manner for the user can be made possible.

It is also proposed that at least one method step involves duplicates of datasets and/or datasets exceeding a maximum term being automatically erased. Preferably, duplicates of datasets and/or datasets exceeding a maximum term that are filed in the memory unit of the computing unit and/or in the memory unit of the control or regulating unit are automatically erased. A maximum term of a dataset is in particular a period of time within which the dataset is provided and enabled for use. Preferably, the maximum term of the dataset, or an expiry date on which the maximum term ends, is embedded in the dataset. Preferably, duplicates of datasets and/or datasets exceeding a maximum term are automatically erased by the computing unit of the electrical unit and/or by the control or regulating unit of the power supply device. Alternatively or additionally, it is conceivable for datasets to be automatically erased after use. Advantageously, a memory space of the electrical unit and/or of the power supply device can be used efficiently. Advantageously, flexible use and enabling of the memory space can be made possible.

The power supply device according to the disclosure, the power supply system according to the disclosure and/or the method according to the disclosure are/is not intended to be restricted in this case to the application and embodiment described above. In particular, the power supply device according to the disclosure, the power supply system according to the disclosure and/or the method according to the disclosure can have a different number of individual elements, components and units and also method steps than that cited herein in order to operate as described herein. Furthermore, values in the ranges of values indicated in this disclosure that are within the cited limits are also intended to be regarded as disclosed and able to be employed in any way.

BRIEF DESCRIPTION OF THE DRAWINGS

Further advantages emerge from the description of the drawings that follows. The drawings depict three exemplary embodiments of the disclosure. The drawings, the description and the claims contain numerous features in combination. A person skilled in the art will expediently also consider the features individually and combine them to form appropriate further combinations.

In the drawings.

DETAILED DESCRIPTION

Figure 1:
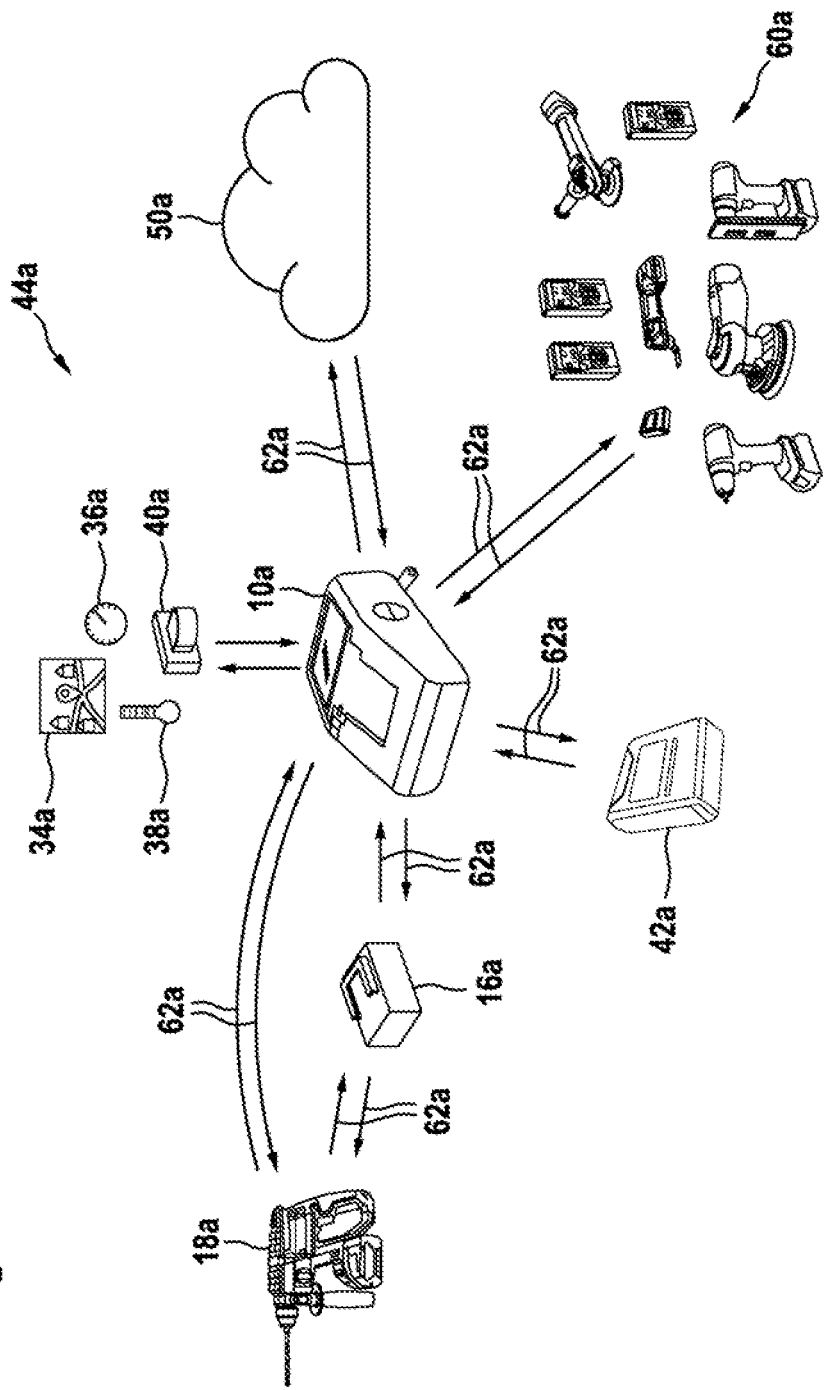
FIG. 1 shows a schematic depiction of a power supply system according to the disclosure.

FIG. 1 shows a schematic depiction of a power supply system 44a. The power supply system 44a comprises a power supply device 10a, The power supply system 44a comprises an electrical unit 16a and a further electrical unit 18a. The further electrical unit 18a is in the form of a machine tool. The further electrical unit 18a is in the form of a drill. The electrical unit 16a is in the form of a battery pack, in particular in the form of a machine tool battery pack. The electrical unit 16a is in the form of a battery pack for the further electrical unit 18a. By way of illustration, FIG. 1 also shows further electrical tools 60a that the power supply system 44a can comprise. The power supply system 44a is described below on the basis of the electrical unit 16a and the further electrical unit 18a; the description can also be transferred to the electrical tools 60a at least substantially analogously. The power supply system 44a comprises a central computing unit 50a. The central computing unit 50a is depicted schematically by a cloud symbol. The central computing unit 50a is in the form of a cloud server. Alternatively, it is conceivable for the central computing unit 50a to be in the form of a server in a different form than a cloud server, in the form of a backend, or the like. The central computing unit 50a is arranged at a physical distance from the power supply device 10a, for example in a company headquarters, in a computer center, or the like (not depicted further here). The power supply system 44a comprises a plurality of external sensor units 32a, 34a, 36a, 38a, 40a, 42a. Communication connections between individual components of the power supply system 44a are indicated by arrows 62a.

Figure 2:
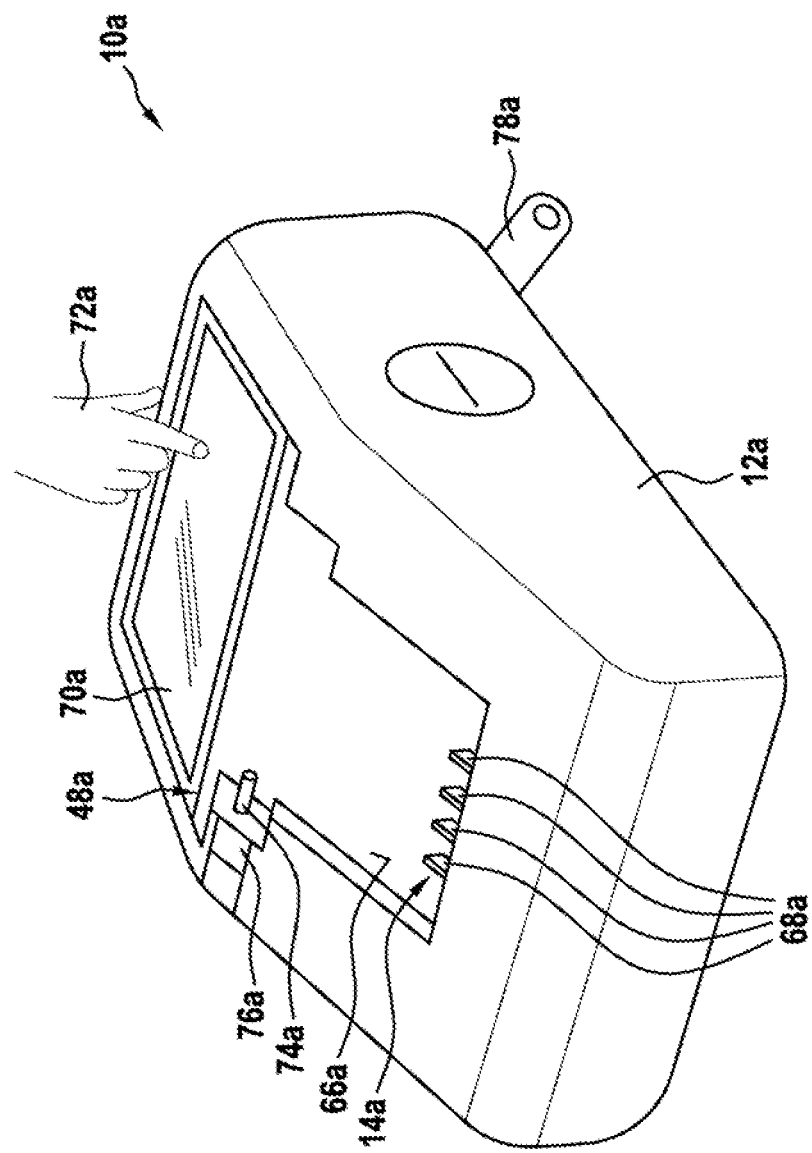
FIG. 2 shows a perspective depiction of a power supply device according to the disclosure of the power supply system according to the invention from FIG. 1.

FIG. 2 shows a schematic depiction of the power supply device 10a of the power supply system 44a from FIG. 1. The power supply device 10a is in the form of a charger. Alternatively, it is conceivable for the power supply device 10a to be in the form of a cable reel, in the form of a construction site distribution box, in the form of a construction power distributor, in the form of a generator or the like.

The power supply device 10a comprises at least one housing unit 12a and at least one interface unit 14a, arranged on the housing unit 12a, for the purpose of electrical coupling to at least one electrical unit 16a, 18a, in particular a battery pack. The interface unit 14a is intended for direct electrical coupling to the electrical unit 16a. The interface unit 14a is intended for indirect electrical coupling to the further electrical unit lea by way of an adapter unit 64a of the power supply system 44a (cf. FIG. 5). The power supply device 10a comprises at least one realtime-operating-system-compatible, in particular multitasking-compatible, control or regulating unit 20a that is set up to take an evaluation of, in particular non-charging-related, item information of the electrical unit 16a and/or of the further electrical unit 18a as a basis for independently performing actions, in particular providing the electrical unit 16a and/or the further electrical unit 18a with at least one dataset (cf. FIG. 3). The power supply device 10a is intended for supplying electrical units 16a, 18a, in particular the electrical unit 16a, with electrical power.

The housing unit 12a is intended for accommodating a plurality of components of the power supply device 10a, in particular the control or regulating unit 20a. At least part of the housing unit 12a is formed from a plastic, from a metal, from a composite material, or the like. At least sections of the interface unit 14a are arranged on an outer side 66a of the housing unit 12a. The interface unit 14a is intended for electromechanical coupling to the electrical unit 16a. The interface unit 14a is at least substantially in the form of an interface unit 14a for electromechanically coupling a battery pack, which is known to a person skilled in the art. The interface unit 14a comprises at least one contact element 68a for the purpose of electrical coupling to the electrical unit 16a. The interface unit 14a comprises four contact elements 68a. The interface unit 14a, in particular at least one contact element 68a of the interface unit 14a, comprises an electrical and/or mechanical coding that is only intended to allow coupling of electrical units 16a, 18a that are intended for use with the power supply device 10a. An electrical unit 16a, 18a that is electrically coupled to the interface unit 14a can be supplied with electrical energy, in particular can be charged, by the interface unit 14a. The interface unit 14a can have at least one fixing element, in particular latching element, that is intended for fixing, in particular latching, the electrical unit 16a to the housing unit 12a during a charging process for the electrical unit 16a (not depicted in more detail here). The power supply device 10a comprises at least one supply connection, which is not depicted further in FIG. 2 for the sake of clarity, for the purpose of connection to a power grid. The supply connection is intended to draw electrical power from the power grid for the purpose of supplying power to further components of the power supply device 10a and for the purpose of charging electrical units 16a, 18a.

The power supply device 10a comprises at least one touch-sensitive operator unit 70a, which is set up for, in particular biometry-dependent, operation of the control or regulating unit 20a. The operator unit 70a is arranged on the housing unit 12a. The operator unit 70a is in the form of a touch-sensitive screen. Alternatively, it is conceivable for the operator unit 70a to comprise touch-sensitive keys, to be in the form of a touchpad, or the like. The operator unit 70a can be used to control, in particular to configure, functions, settings, or the like, of the control or regulating unit 20a. At least part of the operator unit 70a is set up to operate the control or regulating unit 20a on the basis of at least one biometric parameter, such as for example a fingerprint, an iris image, a voice recording, or the like. The operator unit 70a can have at least one operator control element set up to capture a biometric parameter, such as for example a fingerprint scanner, an iris scanner, a voice recognition system, or the like. In the present exemplary embodiment, the operator unit 70a has a fingerprint sensor integrated in the touch-sensitive screen. This is indicated by a hand 72a of a user. The operator unit 70a is set up to allow operator control of the control or regulating unit 20a only by authorized users. The operator unit 70a is set up for user guidance, in particular by means of displays, outputs of advice, or the like. As an alternative or in addition to the operator unit 70a, it is conceivable for the control or regulating unit 20a to be in remotely controllable form, for example by way of a cellphone or a tablet.

The operator unit 70a is set up to provide a user with advice concerning an update process for an electrical unit 16a, 18a, in particular an electrical unit coupled to the interface unit 14a. The operator unit 70a is set up to provide a user with advice concerning a disabling of the electrical unit 16a, 18a for an update, concerning an enabling of the electrical unit 16a, 18a for an update, concerning an ongoing update process, in particular concerning progress of an ongoing update process, concerning successful conclusion of an update and/or concerning an unintentional interruption to the update process. The operator unit 70a is set up to provide advice in the form of a pictogram, in text form, in the form of a color code, or the like. Alternatively, it is conceivable for the operator unit 70a to be set up to provide advice by means of light-emitting elements, in particular LEDs, of different color or by means of differently flashing light-emitting elements, in particular LEDs.

As an alternative or in addition to the power supply device 10a, the electrical unit 16a, 18a, in particular the further electrical unit 18a in the form of a machine tool, can also have an operator unit. The operator unit of the further electrical unit 18a can be in a form at least substantially analogous to that of the operator unit 70a of the power supply device 10a. The operator unit of the further electrical unit 18a can, as an alternative or in addition to the operator unit 70a of the power supply device 10a, be set up to output advice to a user, in particular concerning an update process for the further electrical unit 18a. The operator unit of the further electrical unit 18a may in particular be set up to haptically provide advice, for example by means of an active electronic switch, by means of a vibration motor, or the like. For the purpose of haptic provision of advice, a drive motor of the further electrical unit 18a can form at least part of the operator unit of the further electrical unit 18a. It is conceivable for an output of advice to be provided by means of at least one movement of the drive motor that is unsuitable for driving an insert tool, for example as a result of juddering of the drive motor, as a result of slow clockwise running of the drive motor, as a result of slow anticlockwise running of the drive motor, as a result of intermittent clockwise running of the drive motor, as a result of intermittent anticlockwise running of the drive motor, as a result of pulsed clockwise running of the drive motor, as a result of pulsed anticlockwise running of the drive motor, as a result of alternate clockwise running and anticlockwise running of the drive motor, or the like. In addition, an output of advice, in particular concerning an update process for the electrical unit 16a and/or the further electrical unit 18a, can preferably also be provided by a screen of an external device, such as for example a cellphone or a tablet.

The power supply device 10a comprises at least one locking unit 48a, in particular controllable or regulable by the control or regulating unit 20a, that is intended for fixing the electrical unit 16a to the interface unit 14a, in particular during a data interchange, in an at least substantially theft-proof fashion. The locking unit 48a comprises at least one locking element 74a for fixing the electrical unit 16a to the interface unit 14a in an at least substantially theft-proof fashion. The locking element 74a is in the form of a locking pin. Alternatively, it is conceivable for the locking element 74a to be in the form of a locking clip, in the form of a magnetic lock, or the like. The locking unit 48a comprises at least one lock 76a for locking the locking element 74a in a fixing position in which the locking element 74a fixes the electrical unit 16a to the interface unit 14a. The locking unit 48a, in particular the lock 76a, is electronically operable, in particular by way of the control or regulating unit 20a, for example by means of a cellphone, by means of a key card, by means of an electronic code, or the like. The locking unit 48a is intended for fixing the electrical unit 16a to the interface unit 14a at least until a data interchange between the control or regulating unit 20a and the electrical unit 16a has concluded. Alternatively or additionally, it is conceivable for the locking unit 48a, in particular the lock 76a of the locking unit 48a, to be mechanically operable, for example by means of a mechanical key or by means of a numerical code.

The power supply device 10a comprises at least one security unit 78a intended for fastening the housing unit 12a at least substantially at a fixed location, in particular in an at least substantially theft-proof fashion. The security unit 78a is arranged on the housing unit 12a. The security unit 78a is in a form integral with the housing unit 12a. The security unit 78a is in the form of a security loop. Alternatively, it is conceivable for the security unit 78a to be in the form of a Kensington lock or the like. The security unit 78a is configured for use with a security cable, a padlock, or the like. The housing unit 12a is fastenable by means of the security unit 78a at least substantially at a fixed location in a workshop, on a construction site, in a vehicle, or the like.

Figure 3:
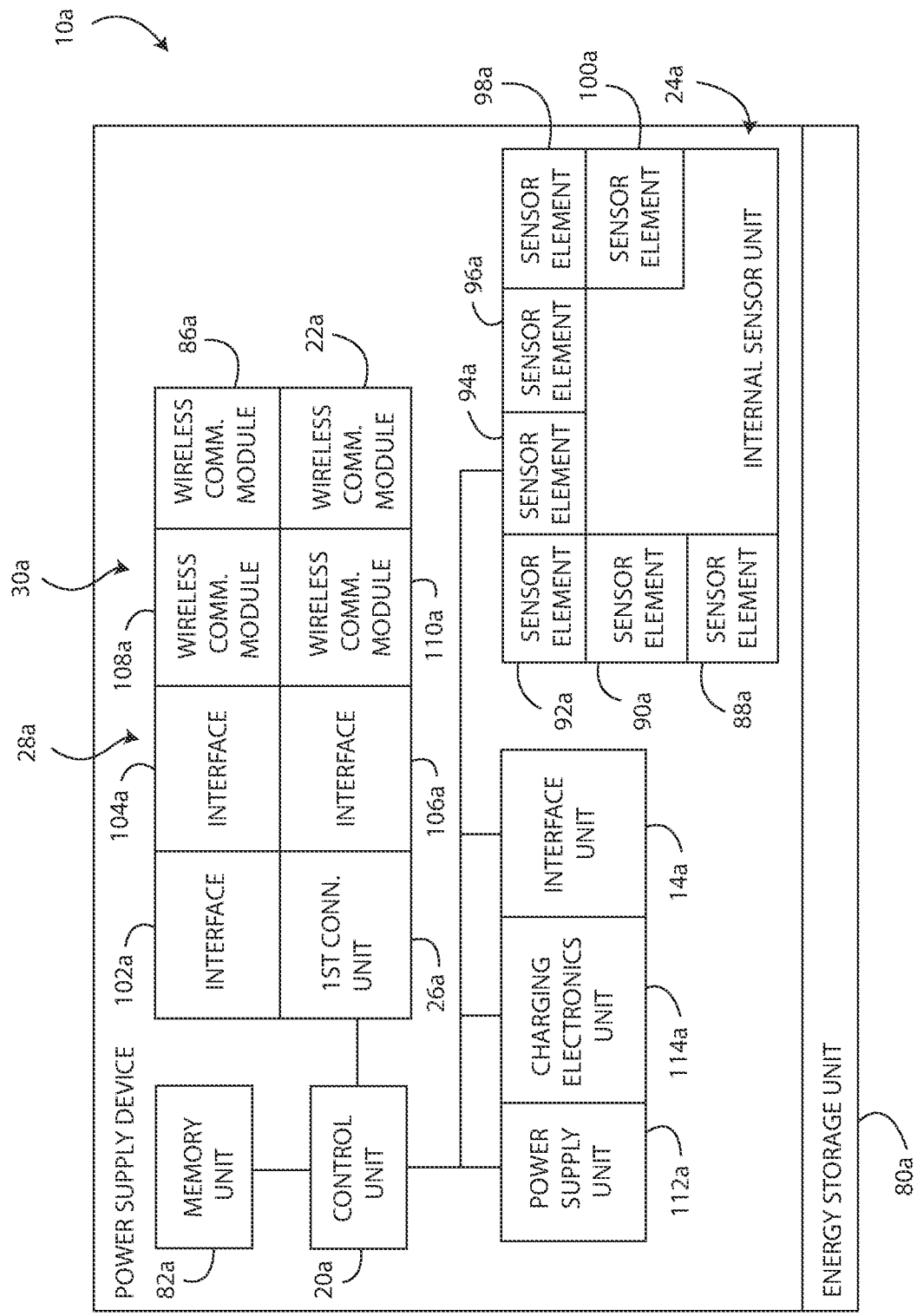
FIG. 3 shows a schematic depiction of the power supply device according to the disclosure.

FIG. 3 shows a schematic depiction of the power supply device 10a. FIG. 3 depicts a plurality of internal components of the power supply device 10a. The power supply device 10a comprises at least one energy storage unit 80a intended for supplying power to at least the control or regulating unit 20a independently of the system voltage. The energy storage unit 80a is in the form of an integrated storage battery. Alternatively, it is conceivable for the energy storage unit 80a to be in the form of a storage capacitor or the like. The energy storage unit 80a is arranged inside the housing unit 12a. Alternatively, it is conceivable for the energy storage unit 80a to be in the form of an external battery pack that is able to be coupled to the interface unit 14a and/or to an additional power supply interface unit of the power supply device 10a. The energy storage unit 80a is intended for independently supplying power to the components of the power supply device 10a, in particular the control or regulating unit 20a, a communication unit 22a and sensors, for at least two weeks, preferably for at least two months, and particularly preferably for at least one year. The energy storage unit 80a is intended for independently supplying power to the components of the power supply device 10a for at least two weeks and for charging the electrical unit 16a at least once, preferably for charging the electrical unit 16a multiple times.

The control or regulating unit 20a comprises at least one memory unit 82a. The memory unit 82a of the control or regulating unit 20a is set up to at least temporarily store data that are to be evaluated and/or that have been evaluated, in particular item information. In particular, the memory unit 82a of the control or regulating unit 20a has a memory size of at least 512 kilobytes, preferably a memory size of at least 1 megabyte. At least part of the control or regulating unit 20a is in the form of a microcontroller or said control or regulating unit comprises at least one microcontroller. The control or regulating unit 20a has a processing power that allows operation of a realtime operating system by the control or regulating unit 20a. The control or regulating unit 20a is capable of being set up in particular to perform a plurality of tasks at least substantially simultaneously. The control or regulating unit 20a is set up for multiprocessing. The control or regulating unit 20a is set up at least for edge computing or for fog computing.

Non-charging-related item information is information about an electrical unit 16a, 18a or surroundings of the electrical unit 16a, 18a that the electrical unit 16a, 18a provides. Non-charging-related item information is independent of a charge, in particular of a state of charge and of a charging process, of an electrical unit 16a, 18a. Item information of the electrical units 16a, 18a can be captured by sensors of the electrical units 16a, 18a and/or by sensors of units that are couplable to the electrical units 16a, 18a, The electrical unit 16a in the form of a battery pack is couplable to the further electrical unit 18a, which is in the form of a machine tool. The further electrical unit 18a can in particular have at least one sensor, preferably a plurality of sensors, for capturing item information. The further electrical unit 18a can transmit captured item information to the electrical unit 16a in the form of a battery pack, in particular to a memory unit 84a of the electrical unit 16a. The electrical unit 16a can provide the control or regulating unit 20a with the item information. The electrical unit 16a is set up to provide the control or regulating unit 20a with item information by way of the interface unit 14a. The interface unit 14a is set up for, in particular bidirectional, data communication between the electrical units 16a, 18a and the control or regulating unit 20a. A data interchange between an electrical unit 16a, 18a and the control or regulating unit 20a can be performed by way of the same contact elements 68a of the interface unit 14a, by way of which the electrical unit 16a, 18a can be supplied with electrical power. Item information of an electrical unit 16a, 18a can in particular be in the form of an operating temperature of the electrical unit 16a, 18a, in the form of a speed of a drive unit of a machine tool, in the form of a type of an insert tool fitted to a machine tool, in the form of a force acting on the electrical unit 16a, 18a, in particular operator force, impact force, or the like, in the form of an operating mode of the electrical unit 16a, 18a, in the form of a surroundings parameter of the electrical unit 16a, 18a, such as for example an ambient temperature, a humidity, an air pressure, or the like, or in the form of other item information that appears appropriate to a person skilled in the art.

The control or regulating unit 20a is set up to collect, process and condition item information of the electrical units 16a, 18a and/or to combine said item information with further information or parameters, in particular for the purpose of generating an increased amount of information in comparison with a sum of all item information of the electrical units 16a, 18a. The control or regulating unit 20a is set up to take an evaluation of item information of the electrical units 16a, 18a as a basis for independently performing actions, in particular at least substantially independently of an input from a user, a command from a central computing unit 50a, a query with a central computing unit 50a, or the like, and in a state communicatively isolated from other control or regulating units, central computing units, or the like. The control or regulating unit 20a is set up to provide the electrical units 16a, 18a with at least one dataset, in particular by way of the interface unit 14a, on the basis of an evaluation of the item information. The control or regulating unit 20a is set up to take an evaluation of the item information as a basis for independently generating the dataset, selecting said dataset from a plurality of stored datasets and/or requesting said dataset, for example from a central computing unit 50a. The dataset can in particular be in the form of an operating-behavior-specific dataset, in the form of an update dataset or in the form of another dataset that appears appropriate to a person skilled in the art. An operating-behavior-specific dataset is a dataset that is formed to automatically adapt operating parameters of an electrical unit 16a, 18a. An update dataset is a dataset that is formed to update an operating program, in particular a piece of firmware, of an electrical unit 16a, 18a. As an alternative or in addition to providing a dataset, the control or regulating unit 20a may be set up to take an evaluation of the item information as a basis for carrying out further actions, for example triggering an alarm, adapting transmission intervals of components connected to the control or regulating unit 20a, outputting advice to a user, or the like.

The power supply device 10a comprises at least one wireless communication unit 22a, arranged at a fixed location on, in particular inside, the housing unit 12a, by way of which the control or regulating unit 20a is set up for a bidirectional realtime-independent data interchange with the electrical units 16a, 18a. The control or regulating unit 20a is set up for a bidirectional realtime-independent data interchange with the electrical units 16a, 18a by way of the wireless communication unit 22a as an alternative or in addition to a bidirectional realtime-independent data interchange with the electrical units 16a, 18a by way of the interface unit 14a. The wireless communication unit 22a is in the form of a Bluetooth module, in particular in the form of a Bluetooth Low Energy module. Alternatively, it is conceivable for the wireless communication unit 22a to be in the form of a radio module, in the form of a WLAN module, in the form of an infrared module, or the like. The wireless communication unit 22a is arranged at a fixed location on the housing unit 12a, in particular so as to be detachable from the housing unit 12a and/or further components of the power supply device 10a only by using a tool. The wireless communication unit 22a is arranged inside the housing unit 12a. The wireless communication unit 22a is arranged on the same circuit board as the control or regulating unit 20a. Alternatively or additionally, it is conceivable for the power supply device 10a to have at least one wireless communication unit that is detachably connectable to the housing unit 12a, for example in the form of a plug-in module. As an alternative or in addition to a data interchange with the electrical units 16a, 18a, it is conceivable for the control or regulating unit 20a to be set up to use the wireless communication unit 22a for communication with an external unit, for example a tablet, a cellphone, or the like.

The power supply device 10a, in particular the control or regulating unit 20a, is set up for bidirectional communication with the central computing unit 50a. The power supply device 10a comprises at least one further communication unit 86a for communicating with the central computing unit 50a. The further communication unit 86a is in the form of a wireless communication unit. The further communication unit 86a is in the form of an LPWAN module. The further communication unit 86a is in the form of an NB IOT module. Alternatively, it is conceivable for the further communication unit 86*a* to be in the form of an LTE CAT M1 module, in the form of a LORA module, in the form of a Sigfox module, in the form of a GSM module, in the form of an LTE module, or the like. Alternatively or additionally, it is conceivable for the further communication unit 86*a* to be in the form of a wired communication unit, for example in the form of a LAN interface or in the form of a Powerline interface.

The power supply device 10*a* comprises at least one internal sensor unit 24*a* set up to capture surroundings parameters that are taken into consideration by the control or regulating unit 20*a* when performing the independent actions or that are taken into consideration when evaluating, in particular non-charging-related, item information. The internal sensor unit 24*a* is arranged on, in particular inside, the housing unit 12*a*. At least part of the internal sensor unit 24*a* is arranged on the same circuit board as the control or regulating unit 20*a*. The internal sensor unit 24*a* has a plurality of different sensor elements 88*a*, 90*a*, 92*a*, 94*a*, 96*a*, 98*a*, 100*a*. The sensor elements 88*a*, 90*a*, 92*a*, 94*a*, 96*a*, 98*a*, 100*a* are set up to capture a plurality of different surroundings parameters. The internal sensor unit 24*a* comprises a first sensor element 88*a*, which is in the form of a temperature sensor. The internal sensor unit 24*a* comprises a second sensor element 90*a*, which is in the form of a position sensor. The internal sensor unit 24*a* comprises a third sensor element 92*a*, which is in the form of an acceleration sensor. The internal sensor unit 24*a* comprises a fourth sensor element 94*a*, which is in the form of a magnetic field sensor. The internal sensor unit 24*a* comprises a fifth sensor element 96*a*, which is in the form of a humidity sensor. The internal sensor unit 24*a* comprises a sixth sensor element 98*a*, which is in the form of an air pressure sensor. The internal sensor unit 24*a* comprises a seventh sensor element 100*a*, which is in the form of a GNSS sensor. The internal sensor unit 24*a* is set up to capture a temperature, an orientation, an acceleration, a magnetic field, a humidity, an air pressure and a navigation satellite signal. The internal sensor unit 24*a* is set up to provide the control or regulating unit 20*a* with captured surroundings parameters. The control or regulating unit 20*a* is set up to evaluate the surroundings parameters, in particular for the purpose of taking them into consideration when performing the independent actions and/or when evaluating, in particular non-charging-related, item information.

The power supply device 10*a* comprises at least one connection unit 26*a*, 25*a*, 30*a* intended for connecting at least one external sensor unit 32*a*, 34*a*, 36*a*, 38*a*, 40*a*, 42*a* to the control or regulating unit 20*a* for data transmission purposes. An external sensor unit 32*a*, 34*a*, 36*a*, 38*a*, 40*a*, 42*a* is in a form such that it is separate from the housing unit 12*a*, in particular is arranged at a physical distance from the housing unit 12*a*. In respect of a further form of the external sensor units 32*a*, 34*a*, 36*a*, 38*a*, 40*a*, 42*a*, in particular in respect of surroundings parameters that are capturable by the external sensor unit 32*a*, 34*a*, 36*a*, 38*a*, 40*a*, 42*a*, the external sensor units 32*a*, 34*a*, 36*a*, 38*a*, 40*a*, 42*a* can be in a form at least substantially analogous to that of the internal sensor unit 24*a*, in particular to that of the sensor elements 88*a*, 90*a*, 92*a*, 94*a*, 96*a*, 98*a*, 100*a* of the internal sensor unit 24*a*. The power supply system 44*a* comprises a first external sensor unit 32*a*, which is in the form of a humidity sensor, for example (cf. FIG. 4). The power supply system 44*a* comprises a second external sensor unit 34*a*, which is in the form of a GLASS sensor. The power supply system 44*a* comprises a third external sensor unit 35*a*, which is in the form of an air pressure sensor. The power supply system 44*a* comprises a fourth external sensor unit 38*a*, which is in the form of a temperature sensor. The power supply system 44*a* comprises a fifth external sensor unit 40*a*, which is in the form of a motion sensor. The power supply system 44*a* comprises a sixth external sensor unit 42*a*, which is in the form of a movement counter. The second external sensor unit 34*a*, the third external sensor unit 35*a*, the fourth external sensor unit 38*a*, the fifth external sensor unit 40*a* and the sixth external sensor unit 42*a* are depicted symbolically in FIG. 1. The power supply device 10*a* has a first connection unit 26*a*. The first connection unit 26*a* is in the form of an electromechanical connection unit (cf. FIG. 4). The power supply device 10*a* has a second connection unit 28*a*. The second connection unit 28*a* is in the form of an electromechanical connection unit. An electromechanical connection unit is intended for electromechanical coupling to an external sensor unit, in particular on the housing unit 12*a* of the power supply device 10*a*. The second connection unit 28*a* is intended for electromechanical coupling to wired external sensor units (not depicted further here for the sake of clarity). The second connection unit 28*a* has at least one interface 102*a*, 104*a*, 106*a* for the purpose of electromechanical coupling to a wired external sensor unit. The second connection unit 28*a* in FIG. 3 has, by way of illustration, three, in particular standardized, interfaces 102*a*, 104*a*, 106*a*. The second connection unit 28*a* has a first interface 102*a*, which is in the form of a USB interface. The second connection unit 28*a* has a second interface 104*a*, which is in the form of a lightning interface. The second connection unit 28*a* has a third interface 106*a*, which is in the form of an RS232 interface. The second connection unit 28*a* is intended for supplying power to the wired external sensor units. The power supply device 10*a* has a third connection unit 30*a*. The third connection unit 30*a* is in the form of a wireless connection unit. A wireless connection unit is set up for a wireless data interchange with an external sensor unit 34*a*, 36*a*, 38*a*, 40*a*, 42*a*. The third connection unit 30*a* is set up for a wireless data interchange with the second external sensor unit 34*a*, with the third external sensor unit 36*a*, with the fourth external sensor unit 38*a*, with the fifth external sensor unit 40*a* and with the sixth external sensor unit 42*a*. The third connection unit 30*a* has two wireless communication modules 108*a*, 110*a* for a wireless data interchange with the external sensor units 34*a*, 36*a*, 38*a*, 40*a*, 42*a*. The third connection unit 30*a* comprises a first communication module 108*a*, which is in the form of an LTE module. The third connection unit 30*a* comprises a second communication module 110*a*, which is in the form of a WLAN module. Alternatively or additionally, it is conceivable for the third connection unit 30*a* to comprise a further communication module, which is in the form of a radio module, in the form of a Bluetooth module, in particular in the form of a Bluetooth Low Energy module, in the form of an LORA module, in the form of an EnOcean module, in the form of an ANT module, in particular in the form of an ANT+ module, in the form of a ZWave module, in the form of a ZigBee module, or the like.

The control or regulating unit 20*a* is set up to combine and evaluate surroundings parameters captured by the internal sensor unit 24*a* and/or by the external sensor units 32*a*, 34*a*, 36*a*, 38*a*, 40*a*, 42*a* with item information of the electrical units 16*a*, 18*a*. The control or regulating unit 20*a* is set up to compress information by combining surroundings parameters captured by the internal sensor unit 24*a* and/or the external sensor units 32*a*, 34*a*, 36*a*, 38*a*, 40*a*, 42*a* with item information of the electrical units 16*a*, 18*a*. The control or regulating unit 20*a* is set up to combine and evaluate the surroundings parameters with the item information for the purpose of independent performance of an action. By way of example, it is conceivable for the control or regulating unit 20*a* to identify a possible theft of at least one of the electrical units 16*a*, 18*a* by combining and evaluating a detected vibration, a variation in air pressure and a movement of at least one of the electrical units 16*a*, 18*a*, in particular outside a defined period of use, and to trigger an alarm.

The control or regulating unit 20*a* is set up to take an evaluation of the surroundings parameters and/or of the item information as a basis for generating at least one operating-behavior-specific dataset and providing said dataset to the electrical unit 16*a* and/or the further electrical unit 18*a*. The operating-behavior-specific dataset is set up to influence an operating behavior of the electrical unit 16*a* and/or of the further electrical unit 18*a*, which is in particular coupled to the electrical unit 16*a*. The operating-behavior-specific dataset is set up to adapt preset operating parameters of the electrical unit 16*a* and/or of the further electrical unit 18*a*. By way of illustration, an operating parameter of the further electrical unit 18*a* in the form of a machine tool can be in the form of an admissible speed range, in the form of an admissible operating temperature range, in the form of an admissible continuous operating period, or the like. It is conceivable for the control or regulating unit 20*a* to be set up to take an evaluation of the surroundings parameters and/or of the item information as a basis for generating an operating-behavior-specific dataset for the further electrical unit 18*a* in the form of a machine tool. The control or regulating unit 20*a* can provide the operating-behavior-specific dataset for the further electrical unit 18*a* in the form of a machine tool to the electrical unit 16*a* in the form of a battery pack, and the electrical unit 16*a* can provide the further electrical unit 18*a* in the form of a machine tool with the operating-behavior-specific dataset. By way of example, it is conceivable for the control or regulating unit 20*a* to be set up to take a height ascertained on the basis of an air pressure, to take a detected temperature and to take a detected maximum continuous operating period of the further electrical unit 18*a* as a basis for generating an operating-behavior-specific dataset and providing said dataset to the electrical unit 16*a*, which is set up to adapt an admissible speed range of the further electrical unit 18*a* such that operation of the further electrical unit 18*a* over the detected maximum continuous operating period under the detected ambient conditions is possible at least substantially perfectly. By way of example, it is conceivable for the control or regulating unit 20*a* to be set up to take a height ascertained on the basis of an air pressure and to take a detected speed range of a machine tool in the form of a hammer drill as a basis for generating an operating-behavior-specific dataset and providing said dataset to the electrical unit 16*a*, which is set up to adapt an operating behavior of a pneumatic system of the machine tool such that efficient operation of the machine tool is made possible under the detected conditions.

The central computing unit 50*a* is set up to provide the power supply device 10*a* with at least one update dataset for at least one electrical unit 16*a*, 18*a*, which update dataset comprises at least one subject parameter and at least one message number. The central computing unit 50*a* is, as an alternative or in addition to the control or regulating unit 20*a*, set up to combine datasets, to evaluate datasets and/or to independently perform actions. By way of example, the central computing unit 50*a* may be set up to take an evaluation of surroundings parameters and/or item information as a basis for generating at least one operating-behavior-specific dataset and providing said dataset to the control or regulating unit 20*a*, which is set up to provide the operating-behavior-specific dataset to an electrical unit 16*a*, 18*a*. The central computing unit 50*a* is set up to provide the control or regulating unit 20*a* with at least one update dataset, said control or regulating unit being set up to provide the update dataset to at least one electrical unit 16*a*, 18*a*, Alternatively or additionally, it is conceivable for the central computing unit 50*a* to be set up to provide the update dataset directly to at least one electrical unit 16*a*, 18*a*, in particular by way of a communication connection to the at least one electrical unit 16*a*, 18*a*. An update dataset can be in the form of a family-specific update dataset or in the form of an electrical-unit-specific update dataset. A family-specific update dataset is an update dataset that is intended to be provided to a plurality of electrical units 16*a*, lea that belong to a specific family of electrical units 16*a*, 18*a*. By way of illustration, a family of electrical units 16*a*, 18*a* can be in the form of a family comprising handheld machine tools, in the form of a family comprising drills, in the form of a family comprising 18 V storage batteries, etc., or else in the form of a family comprising all electrical units 16*a*, 18*a*. An electrical-unit-specific update dataset is an update dataset that is intended to be provided to a single electrical unit 16*a*, 18*a*. A family-specific update dataset comprises at least one subject parameter, at least one message number, at least one family-specific identification parameter and data that are to be provided. An electrical-unit-specific update dataset comprises at least one subject parameter, at least one message number, at least one family-specific identification parameter, at least one electrical-unit-specific identification parameter, in particular a serial number of an electrical unit 16*a*, 18*a*, and data that are to be provided. A subject parameter describes at least a content of a dataset, for example an update to a specific new firmware version of an electrical unit 16*a*, 18*a*. A family-specific identification parameter is a parameter that is assigned to a family of electrical units 16*a*, 18*a* and on the basis of which the family of electrical units 16*a*, 18*a* is uniquely identifiable, for example a bare tool number.

An update dataset, in particular a family-specific update dataset and/or an electrical-unit-specific update dataset, can be in the form of a standard update dataset, in the form of a function update dataset or in the form of a security update dataset. A standard update dataset is formed to update an operating program, in particular a piece of firmware, of an electrical unit 16*a*, 18*a* in respect of minor corrections, in particular in order to correct errors in the operating program. A function update dataset is formed to update and/or extend existing functions of an operating program, in particular a piece of firmware, of an electrical unit 16*a*, 18*a*, to add new functions in the operating program, to enable available, previously unused functions and/or to allow the operating program to access information, in particular individual pieces of information and/or evaluated information, in particular by providing at least one licence key. The central computing unit 50*a* is set up to provide a function update dataset on the basis of a licence for the function update dataset being purchased by a user, on the basis of a subscription for function update datasets being taken out by a user, on the basis of an advertising campaign, in particular for the function update dataset, or the like. A security update dataset is formed to update an operating program, in particular a piece of firmware, of an electrical unit 16*a*, 18*a* in respect of security-critical errors in the operating program, for example bugs, to update available functions of the operating program in terms of security, for example as a result of a change and/or extension to technical and/or legal standards, and/or to add security functions in the operating program, for example as a result of a change and/or extension to technical and/or legal standards.

The power supply device 10a comprises a power supply unit 112a. The power supply unit 112a is intended to supply power to components of the power supply device 10a. The power supply unit 112a is intended to provide electrical power for charging electrical units 16a, 18a. The power supply device 10a comprises a charging electronics unit 114a. The charging electronics unit 114a is intended to control or regulate a charging process for electrical units 16a, 18a.

Figure 4:
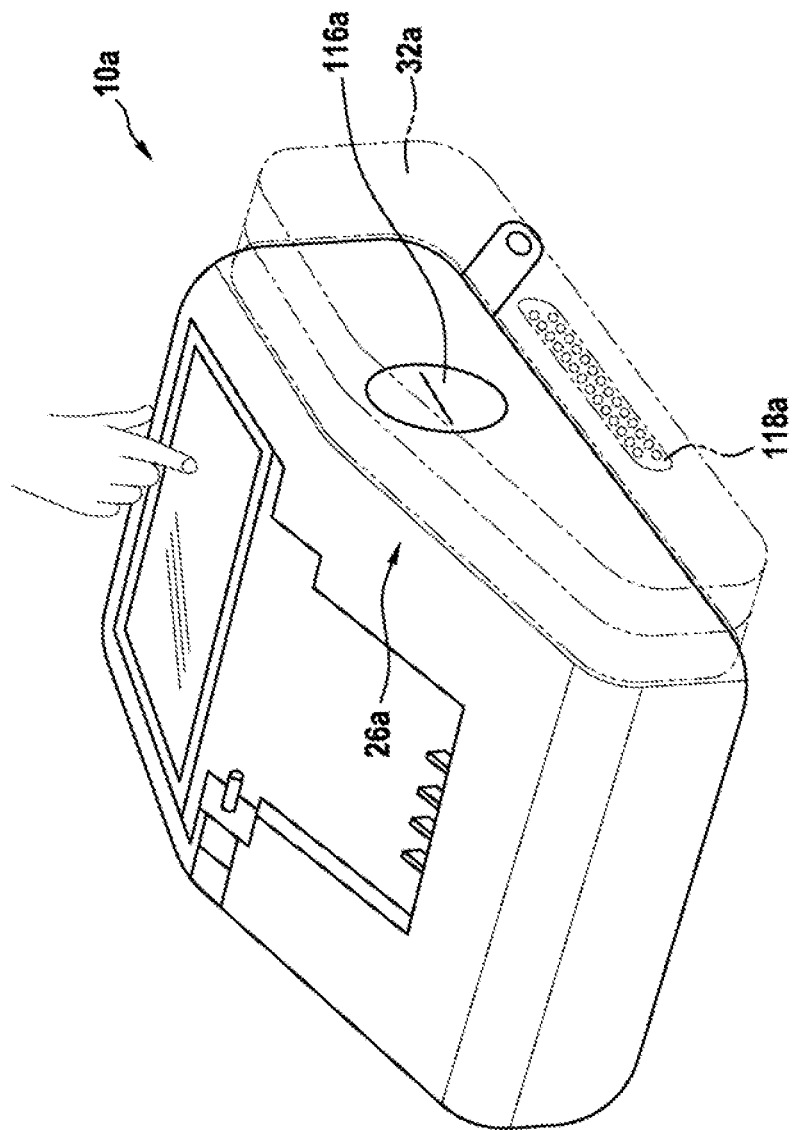
FIG. 4 shows a further schematic depiction of the power supply device according to the disclosure.

FIG. 4 shows a further schematic depiction of the power supply device 10a. The first connection unit 26a is connectable in series for the purpose of electromechanically connecting a plurality of external sensor units 32a to the control or regulating unit 20a. The first connection unit 26a has an interface 116a. The interface 116a of the first connection unit 26a is in the form of a proprietary interface. For the sake of clarity, only a single, in particular the first, external sensor unit 32a is coupled to the interface 116a of the first connection unit 26a in FIG. 4. In order to be able to make out the interface 116a of the first connection unit 26a, the first external sensor unit 32a is depicted in transparent form. Multiple external sensor units 32a are couplable in succession to a single interface 116a of the first connection unit 26a connectable in series. All external sensor units 32a coupled to the interface 116a of the connection unit 26a connectable in series are connected to the control or regulating unit 20a for data transmission purposes, in particular for the purpose of providing captured surroundings parameters. The first external sensor unit 32a is directly electromechanically couplable to the interface 116a of the first connection unit 26a. Further external sensor units are indirectly connectable to the control or regulating unit 20a for data transmission purposes by way of the first external sensor unit 32a that is directly electromechanically coupled to the interface 116a of the first connection unit 26a. The first external sensor unit 32a has an interface 118a for the purpose of electromechanical coupling to a further external sensor unit. A further external sensor unit electromechanically coupled to the interface 118a of the first external sensor unit 32a is indirectly connected to the control or regulating unit 20a for data transmission purposes by way of the first external sensor unit 32a. The further external sensor unit can in turn have an interface to which an additional external sensor unit is electromechanically couplable, the additional external sensor unit being indirectly connected to the control or regulating unit 20a for data transmission purposes by way of the further external sensor unit and by way of the first external sensor unit 32a. All external sensor units 32a directly or indirectly coupled to the interface 116a of the first connection unit 26a connectable in series can be supplied with electrical power by the first connection unit 26a.

Figure 5:
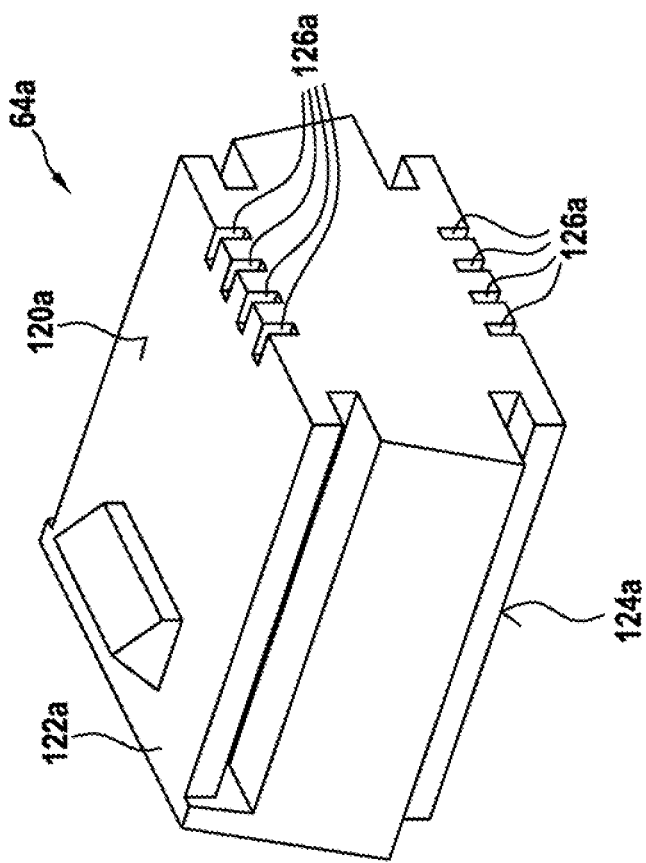
FIG. 5 shows a perspective depiction of an adapter unit of the power supply system according to the disclosure from FIG. 1.

FIG. 5 shows a perspective depiction of an adapter unit 64a of the power supply system 44a from FIG. 1. The adapter unit 64a is set up for electromechanically coupling the further electrical unit 18a to the power supply device 10a. The interface unit 14a of the power supply device 10a is in a form corresponding to that of interfaces of the electrical unit 16a in the form of a battery pack. The adapter unit 64a has interfaces 126a, in each case in a form analogous to that of the interfaces of the electrical unit 16a in the form of a battery pack, on a first side 120a of a housing 122a of the adapter unit 64a and on a second side 124a of the housing 122a, which is remote from the first side 120a of the housing 122a. The adapter unit 64a is electromechanically couplable to the further electrical unit 18a in the form of a machine tool on the first side 120a of the housing 122a and to the interface unit 14a of the power supply device 10a on the second side 124a of the housing 122a. The adapter unit 64a is set up to electromechanically connect the further electrical unit 18a in the form of a machine tool to the power supply device 10a without using a battery pack. The adapter unit 64a has at least one electronics unit set up to ensure (not depicted further here) at least substantially error-free data transmission and/or power transmission between the electrical unit 18a in the form of a machine tool and the power supply device 10a, in particular the control or regulating unit 20a.

Figure 6:
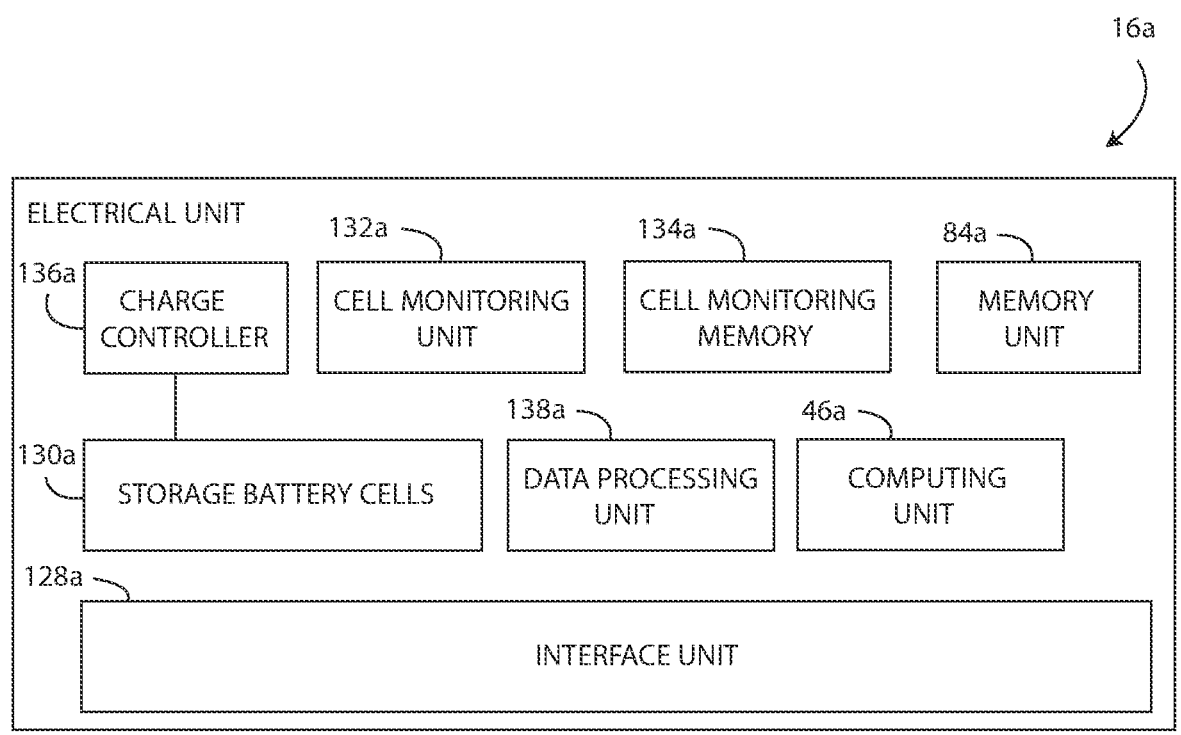
FIG. 6 shows a schematic depiction of an electrical unit of the power supply system according to the disclosure from FIG. 1.

FIG. 6 shows a schematic depiction of the electrical unit 16a of the power supply system 44a from FIG. 1. FIG. 6 depicts a plurality of internal components of the electrical unit 16a. The electrical unit 16a comprises at least one computing unit 46a set up to carry out a plausibility check on datasets received from the power supply device 10a. The computing unit 46a has the memory unit 84a. The memory unit 84a of the computing unit 46a has a memory size sufficient for storing at least one dataset of item information. The memory unit 84a of the computing unit 46a has a database structure for data management. The computing unit 46a, to check the plausibility of datasets received from the power supply device 10a, is set up to check whether and which of the transmitted datasets are relevant to the electrical unit 16a, whether specific datasets are intended for forwarding to a further electrical unit 18a, whether a transmitted dataset is already present in the memory unit 64a of the electrical unit 16a, whether a dataset is current, or the like. The computing unit 46a is set up to subject only datasets ascertained as plausible to further processing. The computing unit 46a is set up to erase implausible datasets.

The computing unit 46a is set up to provide the power supply device 10a with at least one dataset of item information that comprises at least one electrical-unit-specific identification parameter and at least one message number. The electrical unit 16a and/or the further electrical unit 18a, in particular coupled to the electrical unit 16a, comprise/comprises at least one sensor unit for capturing item information and/or surroundings parameters of the electrical unit 16a and/or the further electrical unit 18a. The computing unit 46a is set up to generate the dataset of item information on the basis of item information and/or surroundings parameters captured by the electrical unit 16a and/or by the further electrical unit 18a. The computing unit 46a is set up to buffer-store the dataset of item information in the memory unit 84a of the electrical unit 16a until said dataset is transmitted to the power supply device 10a. A dataset of item information comprises an electrical-unit-specific identification parameter, a message number and the item information. An electrical-unit-specific identification parameter is a unique parameter that is assigned to a single electrical unit 16a, 18a and on the basis of which the electrical unit 16a, 18a is uniquely identifiable. The electrical-unit-specific identification parameter comprises at least one serial number of the electrical unit 16a, 18a, preferably a bare tool number of the electrical unit 16a, 18a and a serial number of the electrical unit 16a, 18a. The message number is in the form of a consecutive number. The message number is intended for putting a dataset of an electrical unit 16a, 18a in a chronological order in relation to all other datasets of the same electrical unit 16a, 18a. The higher the message number of a dataset, the more recent a time of generation of the dataset.

The electrical unit 16a comprises an interface unit 128a. The interface unit 128a of the electrical unit 16a is intended for electromechanical coupling to the interface unit 14a of the power supply device 10a. The electrical unit 16a comprises storage battery cells 130a. The storage battery cells 130a are intended for storing electrical power. The electrical unit 16a comprises a cell monitoring unit 132a. The cell monitoring unit 132a is set up to monitor the storage battery cells 130a, in particular cell parameters, such as for example state of charge, discharge current or charge cycles, of the storage battery cells 130a. The electrical unit 16a comprises a cell monitoring memory 134a. The cell monitoring memory 134a is set up to store cell data captured by the cell monitoring unit 132a. The electrical unit 16a comprises a charge controller 136a and a data processing unit 138a, The charge controller 136a and/or the data processing unit 138a are intended for controlling or regulating a charging process for the electrical unit 16a.

Figure 7:
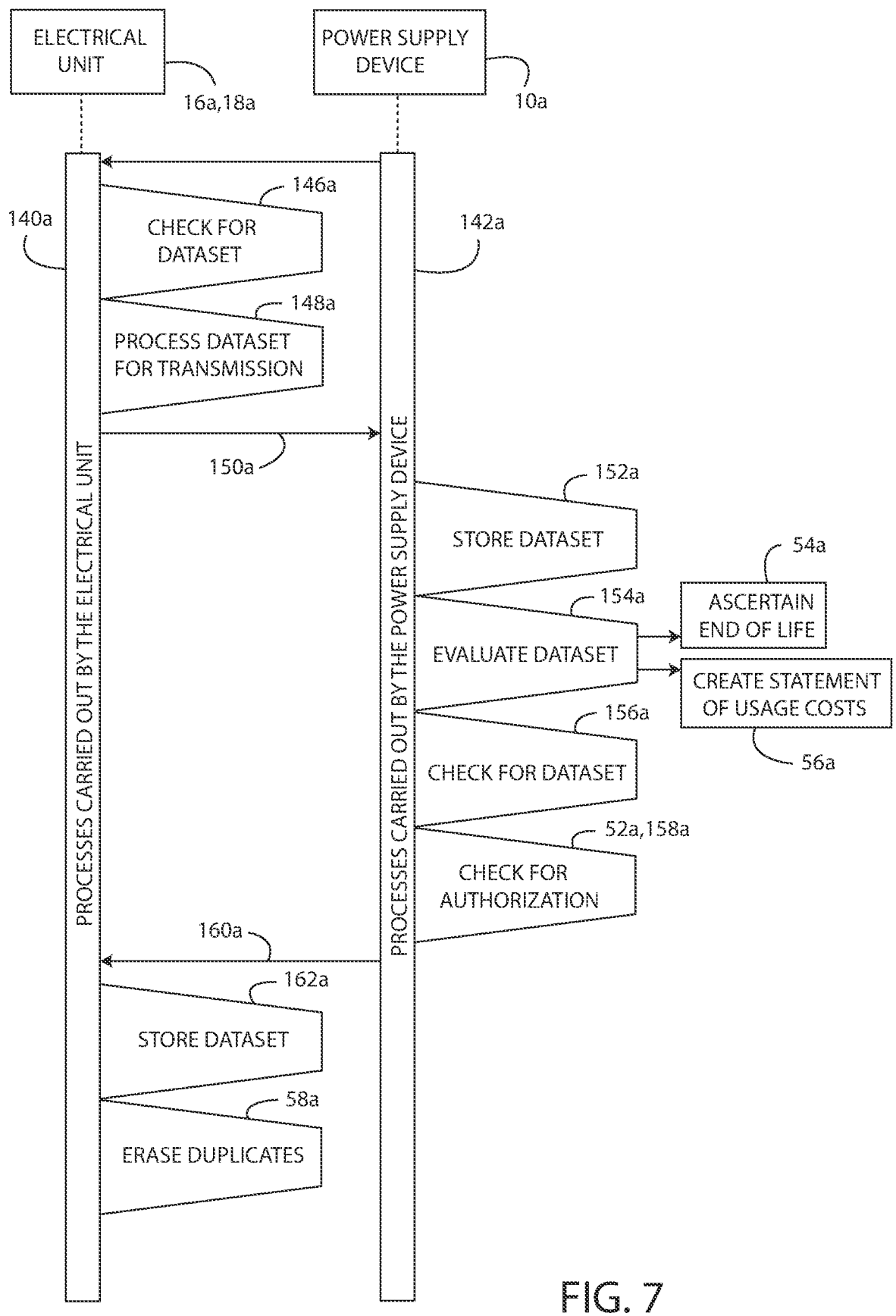
FIG. 7 shows a schematic depiction of a flowchart for a method according to the disclosure for operating the power supply system according to the disclosure from FIG. 1.

FIG. 7 shows a schematic depiction of a flowchart for a method for operating the power supply system 44a from FIG. 1. The depiction presents a sequence of a data transmission between the electrical unit 16a, or the further electrical unit 18a, and the power supply device 10a. At least substantially analogously to the depicted sequence, a data transmission could also take place between the electrical unit 16a, or the further electrical unit 18a, and the central computing unit 50a or between the electrical unit 16a and the further electrical unit 18a. A first column 140a is used to plot processes that are carried out by the electrical unit 16a, or by the further electrical unit 18a. A second column 142a is used to plot processes that are carried out by the power supply device 10a. At least one method step 144a involves the electrical unit 16a, or the further electrical unit 18a, being connected to the power supply device 10a. The electrical unit 16a, or the further electrical unit 18a, is electrically coupled to the interface unit 14a of the power supply device 10a. A further method step 146a involves a check being performed to determine whether the electrical unit 16a, or the further electrical unit 18a, has at least one dataset to be transmitted. If the electrical unit 16a, or the further electrical unit 18a, has at least one dataset to be transmitted, the dataset is processed in a further method step 148a for transmission to the power supply device 10a. A further method step 150a involves the dataset being transmitted to the power supply device 10a. A further method step 152a involves the dataset being stored in the power supply device 10a. A further method step 154a involves the at least one dataset provided by the electrical unit 16a, or by the further electrical unit 18a, at least one dataset provided by the power supply device 10a and/or at least one dataset provided by the central computing unit 50a being evaluated.

At least one further method step 54a involves an evaluation of at least one dataset provided by the power supply device 10a, by the electrical unit 16a, or by the further electrical unit 18a, and/or by the central computing unit 50a being taken as a basis for ascertaining a probable end of life of the electrical unit 16a, or of the further electrical unit 18a, and offering a user at least one replacement service for the electrical unit 16a, or for the further electrical unit 18a. A probable end of life of the electrical unit 16a, or of the further electrical unit 18a, is ascertained by evaluating at least one dataset that comprises at least item information and/or surroundings parameters. A probable end of life of the electrical unit 16a, or of the further electrical unit 18a, is preferably ascertained by evaluating a plurality of datasets, in particular a plurality of datasets captured at different times. A probable end of life of the electrical unit 16a, or of the further electrical unit 18a, is ascertained by the control or regulating unit 20a of the power supply device 10a, by the central computing unit 50a and/or by the computing unit 46a of the electrical unit 16a. A probable end of life of an electrical unit 16a, 18a is in the form of a time at which the electrical unit 16a, 18a will probably be faulty. A replacement service for an electrical unit 16a, 18a is in the form of a service that involves the electrical unit 16a, 18a being replaced with a new, in particular operational, electrical unit before or when the probable end of life of the electrical unit 16a, 18a is reached.

At least one further method step 56a involves an evaluation of at least one dataset provided by the power supply device 10a, by the electrical unit 16a, or by the further electrical unit 18a, and/or by the central computing unit 50a being taken as a basis for creating at least one statement of usage costs. A statement of operating costs is created by evaluating at least one dataset that comprises at least item information and/or surroundings parameters. Preferably, a statement of operating costs is created by evaluating a plurality of datasets, in particular a plurality of datasets captured at different times. A statement of operating costs is ascertained by the control or regulating unit 20a of the power supply device 10a, by the central computing unit 50a and/or by the computing unit 46a of the electrical unit 16a. A statement of operating costs is a list of costs incurred through use of an electrical unit 16a, 18a or of a family of electrical units 16a, 18a, for example on the basis of a detected wear, a detected period of use, use under specific detected ambient conditions, or the like. Method steps 54, 56 are optional method steps. Method steps 54, 56 can be carried out simultaneously or independently of one another. As an alternative or in addition to method steps 54, 56, it is conceivable for at least one further method step to involve an evaluation of at least one dataset provided by the power supply device 10a, by the electrical unit 16a, or by the further electrical unit 18a, and/or by the central computing unit 50a being taken as a basis for offering and/or carrying out at least one inventory optimization for electrical units 16a, 18a, offering at least one training for use, offering at least one more powerful electrical unit, or the like.

A further method step 156a involves checking whether the power supply device 10a has at least one dataset to be transmitted to the electrical unit 16a, or to the further electrical unit 18a. At least one further method step 52a involves a, in particular technical, compatibility of at least one electrical unit 16a, 18a with at least one dataset to be transmitted to the electrical unit 16a, 18a being checked. A further method step 158a involves at least one authorization to transmit at least one dataset to the electrical unit 16a, or to the further electrical unit 18a, being checked. In the present exemplary embodiment, method steps 52a, 158a are, by way of illustration, carried out at least substantially simultaneously. Alternatively, it is also conceivable for method steps 52a, 158a to be carried out in succession. Method steps 52a, 158a are depicted in detail in FIG. 8. A further method step 160a involves at least one dataset being transmitted to the electrical unit 16a, or to the further electrical unit 18a. A further method step 162a involves the dataset being stored in the electrical unit 16a, or in the further electrical unit 18a.

At least one further method step 58a involves duplicates of datasets and/or datasets exceeding a maximum term being automatically erased. The method depicted in FIG. 7 involves, by way of illustration, duplicates of datasets and/or datasets exceeding a maximum term that are filed in the memory unit 84a of the computing unit 46a of the electrical unit 16a being automatically erased. Alternatively or additionally, however, it is also conceivable for duplicates of datasets and/or datasets exceeding a maximum term that are filed in the memory unit 82a of the control or regulating unit 20a of the power supply device 10a to be automatically erased. A maximum term of a dataset is a period of time within which the dataset is provided and enabled for use. The maximum term of the dataset, or an expiry date on which the maximum term ends, is embedded in the dataset. Duplicates of datasets and/or datasets exceeding a maximum term are automatically erased by the computing unit 46a of the electrical unit 16a and/or by the control or regulating unit 20a of the power supply device 10a. Alternatively or additionally, it is conceivable for datasets to be automatically erased after use. A data transmission can be repeated, in particular after use of the electrical unit 16a, or of the further electrical unit 18a, and/or of the power supply device 10a.

Figure 8:
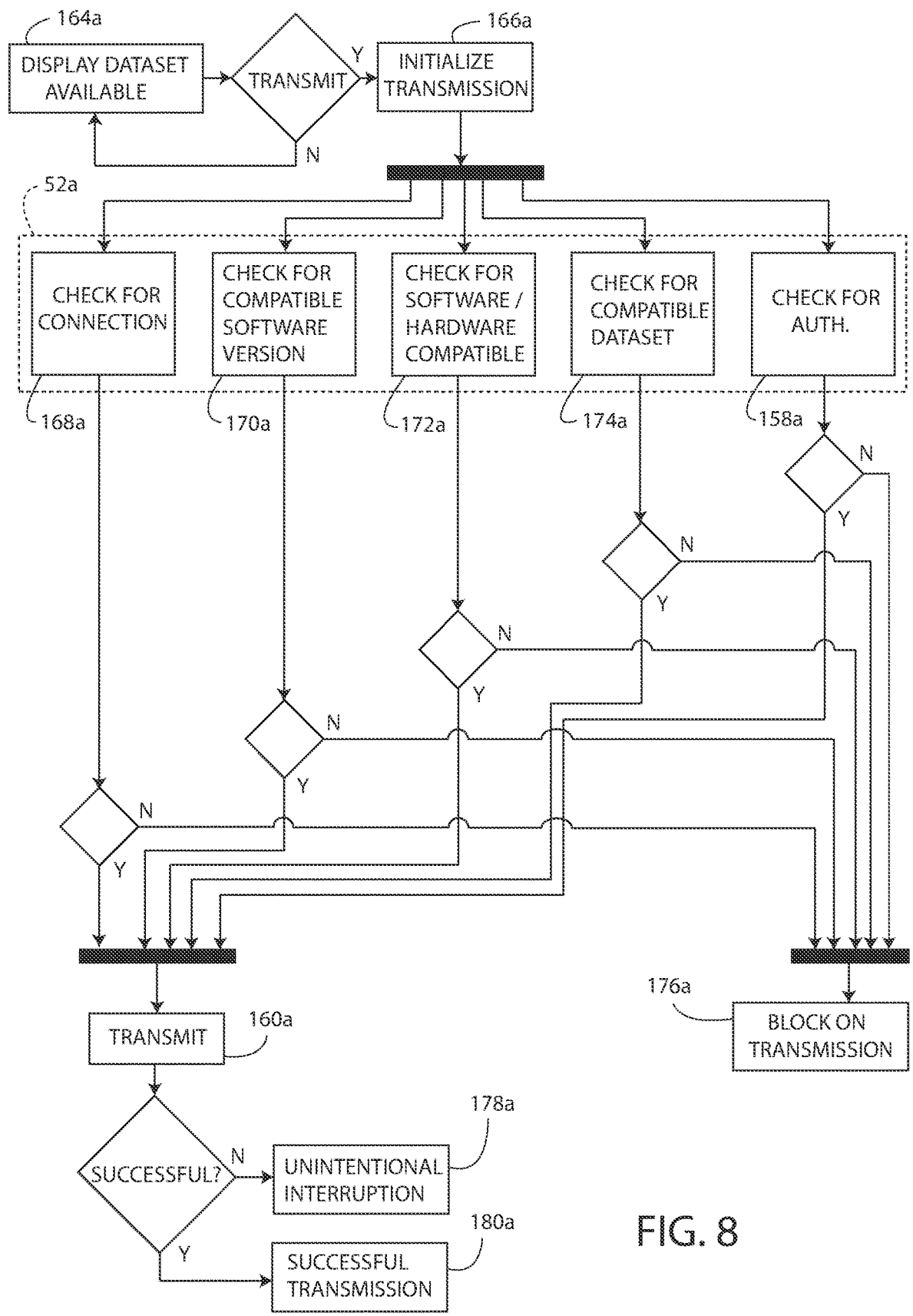
FIG. 8 shows a schematic depiction of a further flowchart of the method according to the disclosure for operating the power supply system according to the disclosure from FIG. 1.

FIG. 8 shows a schematic depiction of a further flowchart for the method for operating the power supply system 44a from FIG. 1. FIG. 8 depicts method steps 52a, 158a in detail. The method is described below on the basis of a transmission of a dataset, in particular an update dataset, from the power supply device 10a to the electrical unit 16a. In principle, however, the method can also be carried out, at least substantially analogously, as a transmission of a dataset from the power supply device 10a to the further electrical unit 18a, as a transmission of a dataset from the central computing unit 50a to the electrical unit 16a or as a transmission of a dataset from the central computing unit 50a to the further electrical unit 18a. A method step 164a involves displaying that a dataset to be transmitted is available. If a decision is made to transmit the dataset, a further method step 166a involves a transmission being initialized. In an initialization phase, method steps 52a, 158a are carried out, in particular simultaneously.

Method step 52a involves a compatibility of software contained in the dataset to be transmitted with hardware of the electrical unit 16a and/or firmware of the electrical unit 16a being checked. A check is performed to determine whether an operating program contained in the dataset is operable by an operating electronics unit of the electrical unit 16a. Method step 52a comprises a partial method step 168a. Partial method step 168a involves a check being performed to determine whether a connection for data transmission purposes exists or can be established between the power supply device 10a and the electrical unit 16a.

Method step 52a comprises a further partial method step 170a. Partial method step 170a involves a compatibility of a software version contained in the dataset to be transmitted with a firmware version of the electrical unit 16a being checked. A compatibility of software contained in the dataset to be transmitted with firmware of the electrical unit 16a is checked on the basis of a build number of the software and/or of the firmware. A compatibility of the software contained in the dataset to be transmitted with the firmware of the electrical unit 16a is checked on the basis of specific software components already contained in the firmware of the electrical unit 16a. A compatibility of the software contained in the dataset to be transmitted with the firmware of the electrical unit 16a is checked on the basis of software components already combined with one another in the firmware of the electrical unit 16a. By way of illustration, it is conceivable for a compatibility of the software contained in the dataset to be transmitted with the firmware of the electrical unit 16a to require the presence of specific software components in the firmware of the electrical unit 16a. The presence of the specific software components in the firmware of the electrical unit 16a is checked before the dataset is transmitted. Transmission of the dataset is enabled on the basis of the presence of the specific software components in the firmware of the electrical unit 16a. By way of illustration, it is conceivable for the dataset that is to be transmitted to be in the form of an update dataset that contains a firmware update for the electrical unit 16a. It is conceivable for operability of the firmware update to require software components of preceding firmware updates in the firmware of the electrical unit 16a. Before the update dataset is transmitted, a presence of the software components of the preceding firmware updates in the firmware of the electrical unit 16a is checked. Transmission of the dataset is enabled on the basis of a presence of the software components of the preceding firmware updates in the firmware of the electrical unit 16a. It is conceivable for the absence of the software components of the preceding firmware updates in the firmware of the electrical unit 16a before the update dataset is transmitted to be taken as a basis for transmitting at least one further update dataset that contains the preceding firmware updates.

Method step 52a comprises a further partial method step 172a. Further partial method step 172a involves a compatibility of the software contained in the dataset to be transmitted with hardware and/or firmware of a communication unit of the electrical unit 16a, which communication unit is set up to receive the dataset, being checked. In the present exemplary embodiment, the interface unit 128a of the electrical unit 16a is used as a communication unit of the electrical unit 16a. Alternatively or additionally, it is conceivable for the electrical unit 16a to have a communication unit in a different form than the interface unit 128a of the electrical unit 16a.

Method step 52a comprises a further partial method step 174a. Partial method step 174a involves a, in particular technical, compatibility of the dataset to be transmitted with the power supply device 10a and/or with another device, for example a cellphone or a tablet, set up to transmit the dataset to the electrical unit 16a being checked. A compatibility of the dataset to be transmitted with hardware of the power supply device 10a and/or with hardware of the other device set up to transmit the dataset to the electrical unit 16a is checked. A capacity of the memory unit 82a of the power supply device 10a and/or of the other device for buffer-storing the dataset to be transmitted is checked.

Method step 52a involves a hardware version of all devices and communication interfaces involved in transmitting the dataset being checked. The hardware versions of the devices and communication interfaces are compared with a combination table that comprises all compatible combinations of hardware versions. Transmission of the dataset is enabled on the basis of a comparison of the hardware versions of the devices and the communication interfaces with the combination table. The, in particular technical, compatibility of the electrical unit 16a with the dataset to be transmitted to the electrical unit 16a is checked by the control or regulating unit 20a of the power supply device 10a, by the computing unit 46a of the electrical unit 16a and/or by the central computing unit 50a. Partial method steps 168, 170, 172, 174 are carried out at least substantially simultaneously in the present exemplary embodiment. Alternatively, it is conceivable for partial method steps 168, 170, 172, 174 to be carried out in succession.

Method step 158 involves at least one authorization to transmit at least the dataset to the electrical unit 16a being checked. At least one role-related authorization, at least one electrical-unit-related authorization, at least one application-related authorization, at least one service-related authorization, at least one person-related authorization, at least one customer-related authorization, at least one reward-dependent authorization, at least one trade-related authorization, at least one location-dependent authorization, at least one time-dependent authorization and/or least one status-related authorization to transmit the dataset to the electrical unit 16a is/are checked. The role-related authorization can be in the form of a colleague-related authorization or in the form of an administration-related authorization. A colleague-related authorization is an authorization of a colleague, for example a storeperson (warehouse keeper), a company boss, a general manager, a unit leader, an employee, a worker, a group manager, a construction site manager, or the like, of a company that has the electrical unit 16a. Different colleagues can have different authorizations. By way of illustration, it is conceivable for an authorization to transmit the update dataset to the electrical unit 16a to be checked and for the update dataset to be transmitted only if a colleague-related authorization of a storeperson is available, for example to ensure transmission outside working hours. An administration-related authorization is an authorization of a third party, such as for example a dealer, a service provider, or the like.

The electrical-unit-related authorization indicates whether the electrical unit 16a or a family of electrical units 16a is authorized to receive the dataset. The electrical-unit-related authorization is checked on the basis of a family of electrical units 16a, on the basis of a bare tool number of the electrical unit 16a and/or on the basis of a serial number of the electrical unit 16a. By way of illustration, it is conceivable for a dataset that is to be provided for a specific family of electrical units 16a to be provided in a manner tied to an electrical-unit-related authorization in respect of the specific family of electrical units 16a. By way of illustration, it is conceivable for a dataset to be provided in a manner tied to an electrical-unit-related authorization that is dependent on a specific bare tool number. By way of illustration, it is conceivable for a serial number of the electrical unit 16a to be used to check an electrical-unit-related authorization of the electrical unit 16a to receive a purchased update dataset. Alternatively or additionally, it is conceivable for the dataset that is to be transmitted to have an electrical-unit-related authorization, for example to be encrypted with a serial number of a specific electrical unit 16a.

The application-related authorization is an authorization that is dependent on an application for which the electrical unit 16a is intended, for example polishing, grinding, separating, drilling, hammering, or the like. The electrical unit 16a has an, in particular digital, application identifier that comprises possible applications of the electrical unit 16a. Before a dataset is transmitted, the application identifier of the electrical unit 16a is checked and the dataset is transmitted only if relevant to possible applications of the electrical unit 16a. The application identifier is adaptable by a user by means of an update dataset and/or manually, in particular to enable possible applications of the electrical unit 16a. The service-related authorization is an authorization that is dependent on a booking of a, in particular paid, service. By way of illustration, it is conceivable for the service-related authorization to be checked and for transmission of the update dataset to be enabled if a service that can be enabled by the update dataset has been paid for, for transmission of the update dataset to be enabled if a further service has been paid for, and/or for transmission of the update dataset to be enabled if a specific function in an operating program of the electrical unit 16a is enabled.

The person-related authorization is an authorization that applies to a specific, in particular natural or legal, person. The person-related authorization is checked on the basis of an authorization list containing persons authorized to receive the dataset and/or on the basis of a block list containing persons blocked for receiving the dataset. Persons are removed from the authorization list and/or placed on the block list on the basis of abnormal behavior in respect of electrical units 16a, 18a and/or datasets. Abnormal behavior in respect of an electrical unit 16a, 18a and/or a dataset can be in the form of inappropriate handling of the electrical unit 16a, 18a, in the form of late payment behavior, in the form of failure to return hired electrical units 16a, 18a, in the form of failure to observe maintenance schedules for an electrical unit 16a, 18a or in the form of other abnormal behavior in respect of an electrical unit 16a, 18a and/or a dataset that appears appropriate to a person skilled in the art. Persons are removed from the block list and/or placed on the authorization list on the basis of correct behavior in respect of electrical units 16a, 18a and/or datasets. Correct behavior in respect of an electrical unit 16a, 18a and/or a dataset can be in the form of timely payment behavior, in the form of purchase of a plurality of paid services, in the form of appropriate handling of the electrical unit 16a, 18a or in the form of other correct behavior in respect of an electrical unit 16a, 18a and/or a dataset that appears appropriate to a person skilled in the art.

The customer-related authorization is dependent on a type of customer that purchases at least part of a power supply system 44a, in particular at least the electrical unit 16a. The customer-related authorization can in be in the form of an original-equipment-supplier-related authorization or in the form of a direct-customer-related authorization. The original-equipment-supplier-related authorization is dependent on an original equipment supplier that purchases at least part of the power supply system 44a and sells it on under its own name. By way of illustration, it is conceivable for transmission of specific datasets to be enabled merely for original equipment suppliers that purchase the datasets separately. By way of illustration, it is conceivable for transmission of specific datasets to be blocked for competitor original equipment suppliers that are in the form of competitors of a manufacturer of the power supply system 44a. The direct-customer-related authorization is in particular dependent on a direct customer of a manufacturer of the power supply system 44a that purchases at least part of the power supply system 44a directly from the manufacturer of the power supply system 44a. The direct customer can be in the form of a dealer with a specific share of revenue, in the form of a strategic partner of the manufacturer, in the form of a company customer with a specific share of revenue, in the form of a large customer, for example a company having at least 51 employees, in the form of a medium-sized customer, for example a company having between 10 and 50 employees, or in the form of a small customer, for example a company having between 1 employee and 9 employees. The customer-related authorization can be used to provide datasets tailored to specific customer groups. By way of illustration, it is conceivable for a dealer to be authorized to transmit datasets that allow the dealer to view specific data from electrical units 16a, 18a of customers of the dealer.

The reward-dependent authorization is an authorization that is allocated as a reward for a specific behavior or during an advertising campaign. Reward-dependent authorizations can be allocated as a reward for frequent purchase of parts of the power supply system 44a, for frequent booking of services, for traceably, in particular measurably, appropriate handling of electrical units 16a, 18a, or the like. By way of illustration, it is conceivable for, upwards of a specific turnover level of a user, for example purchase of electrical units 16a, 18a with a goods value of at least €500, a reward-dependent authorization to be allocated to the user that allows free transmission of an otherwise chargeable update dataset. By way of illustration, it is conceivable for a user to provide item information for electrical units 16a, 18a that are used to a service provider for evaluation. On the basis of an evaluation of the item information, it is in particular possible for reward-dependent authorizations to be allocated to the user. By way of example, a reward-dependent authorization allowing transmission of an update dataset that is formed to update an operating program of the electrical unit 16a such that a brief overload of the electrical unit 16a is made possible can be allocated to a user that—ascertained on the basis of item information—handles the electrical unit 16a appropriately. The trade-related authorization is an authorization that is dependent on a trade in which an electrical unit 16a, 18a is employed. The trade can be in the form of window construction, in the form of carpentry, in the form of kitchen construction, in the form of tiling or in the form of another trade that appears appropriate to a person skilled in the art. A trade-related authorization can be taken as a basis for providing datasets specifically coordinated with a trade.

The location-dependent authorization is dependent on a location, in particular a region, at/in which the power supply system 44a, in particular an electrical unit 16a, 18a, is used. The location-dependent authorization is dependent on conditions prevailing at a location, in particular on ambient conditions and/or legal conditions. By way of illustration, it is conceivable for a location-dependent authorization to be in a different form in regions with a high average ambient temperature than in regions with a low average ambient temperature. By way of illustration, it is conceivable for different location-dependent authorizations to be allocated in different countries on the basis of a legislation in the countries. The location-dependent authorization is dependent on services provided at a location. By way of illustration, it is conceivable for location-dependent authorizations at a specific location to be allocated that merely allow transmission of datasets related to services provided at that location. The time-dependent authorization is an authorization that is dependent on specific times related to the power supply system 44a, in particular to the electrical unit 16a. The time-dependent authorization can be dependent on daily working hours of a user, on a season, on a time in which the electrical unit 16a is used, on a time in which the electrical unit 16a is not used or on another time that appears appropriate to a person skilled in the art.

The status-related authorization is an authorization that is dependent on a status of the power supply system 44a, in particular the electrical unit 16a, on a status of a user and/or on a status of devices related to the power supply system 44a, in particular to the electrical unit 16a. The status can be in the form of a state of charge of the power supply device 10a, in the form of a state of charge of the electrical unit 16a, in the form of a state of charge of a battery-operated communication unit, in the form of a state of charge of a cellphone, in the form of a state of charge, in particular in the form of a remaining range, of a vehicle in which the power supply device 10a and/or the electrical unit 16a are/is arranged, in the form of a time of day, in the form of a country of residence, in the form of an available data volume, in the form of working hours or leisure time of a user, in the form of a vacation of a user or in the form of another status that appears appropriate to a person skilled in the art. In the present exemplary embodiment, method step 158 involves all listed authorizations to transmit the dataset being checked. Alternatively, it is conceivable for only a subset of the authorizations to be checked. A combination of the, in particular technical, compatibility of the electrical unit 16a with the dataset to be transmitted to the electrical unit 16a with the authorizations to transmit the dataset is checked.

If the, in particular technical, compatibility of the electrical unit 16a with the dataset to be transmitted to the electrical unit 16a is not found in method step 52a or if the authorizations to transmit the dataset are found not to exist in method step 158a, a further method step 176a involves the dataset not being transmitted to the electrical unit 16a and advice of a block on transmission being output. If the, in particular technical, compatibility of the electrical unit 16a with the dataset to be transmitted to the electrical unit 16a is found in method step 52a and if the authorizations to transmit the dataset are found to exist in method step 158a, method step 160a involves the dataset being transmitted to the electrical unit 16a and advice concerning an ongoing transmission of the dataset being output. If the transmission of the dataset is not successful, a further method step 178a involves advice concerning an unintentional interruption to the transmission being output. If the transmission of the dataset is successful, a further method step 180a involves advice concerning a successful transmission of the dataset being output.

In respect of further method steps of the method for operating the power supply system 44a, reference can be made to the preceding description of the power supply system 44a, since this description can analogously also be read for the method and therefore all of the features concerning the power supply system 44a are also deemed to be disclosed in regard to the method for operating the power supply system 44a.

Figure 9:
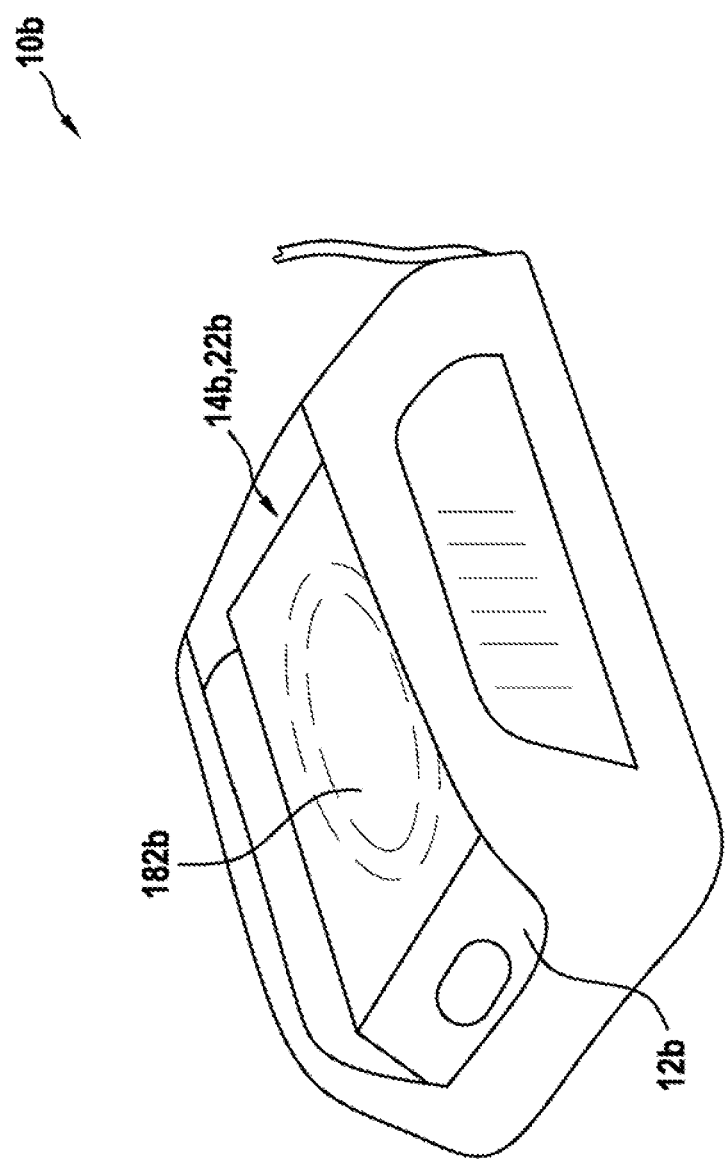
FIG. 9 shows a perspective depiction of an alternative power supply device according to the disclosure.
Figure 10:
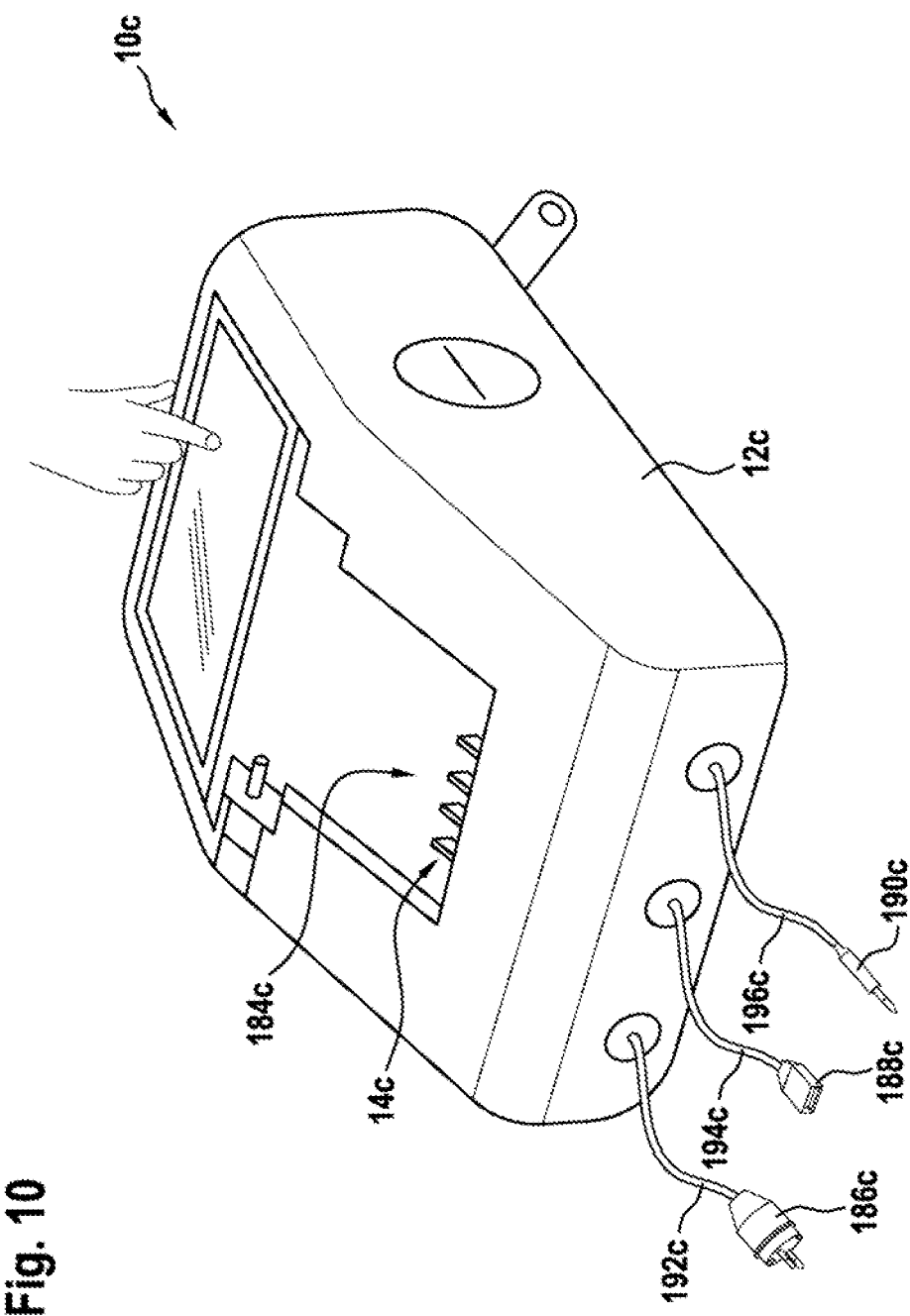
FIG. 10 shows a perspective depiction of a further alternative power supply device according to the disclosure.

FIGS. 9 and 10 show two further exemplary embodiments of the disclosure. The descriptions below and the drawings are essentially restricted to the differences between the exemplary embodiments, reference also being able to be made, in principle, to the drawings and/or the description of the other exemplary embodiments, in particular of FIGS. 1 to 8, in regard to components designated in the same way, in particular in regard to components having identical reference signs. To distinguish between the exemplary embodiments, the letter a follows the reference signs of the exemplary embodiment in FIGS. 1 to 8. In the exemplary embodiments of FIGS. 9 and 10, the letter a is replaced by the letters b and c.

FIG. 9 shows a perspective depiction of an alternative power supply device 10b. The power supply device 10b comprises at least one wireless communication unit 22b. The power supply device 10b comprises an interface unit 14b. The interface unit 14b is in the form of an inductive interface unit that forms at least part of the communication unit 22b. The power supply device 10b has the wireless communication unit 22b, at least part of which is formed by the inductive interface unit 14b, as an alternative to a wireless communication unit in a form such that it is separate from the interface unit 14b. Alternatively, it is conceivable for the power supply device 10b to have the wireless communication unit 22b, at least part of which is formed by the inductive interface unit 14b, in addition to a wireless communication unit in a form such that it is separate from the interface unit 14b. The inductive interface unit 14b is at least substantially in a form, in particular in respect of wireless power transmission, that is known to a person skilled in the art. The inductive interface unit 14b forms at least substantially the whole of the wireless communication unit 22b. The inductive interface unit 14b is set up for data transmission to the electrical unit and/or for data reception from the electrical unit in addition to power transmission to an electrical unit, which is not depicted further. A control or regulating unit of the power supply device 10b is set up to use the inductive interface unit 14b for a bidirectional realtime-independent data interchange with the electrical unit. The interface unit 14b comprises a charging area 182b that is arranged on a housing unit 12b of the power supply device 10b and on which the electrical unit can be arranged.

FIG. 10 shows a perspective depiction of a further alternative power supply device 10c. The power supply device 10c comprises an interface unit 14c. The interface unit 14c is in the form of a multifunctional interface unit that is intended for electromechanical coupling to a plurality of different electrical units (not depicted further here). The interface unit 14c is intended for electromechanical coupling to a plurality of different electrical units that have contact elements in different forms, contact elements in different arrangements and/or a different number of contact elements. The interface unit 14c has a plurality of different electromechanical interfaces 184c, 186c, 188c, 190c. A first interface 184c of the interface unit 14c is in the form of an interface that is known to a person skilled in the art for the purpose of coupling to an electrical unit in the form of a battery pack. A second interface 186c, a third interface 188c and a fourth interface 190c of the interface unit 14c are in the form of different wired interfaces. The second interface 186c is arranged on a first cable 192c of the interface unit 14c. The third interface 188c is arranged on a second cable 194c of the interface unit 14c. The fourth interface 190c is arranged on a third cable 196c of the interface unit 14c. At least sections of the interfaces 186c, 188c, 190c arranged on the cables 192c, 194c, 196c are in a form such that they are extendable from a housing unit 12c of the power supply device 10c. The interface unit 14c has retraction mechanisms that are intended for automatic retraction, and automatic rolling-up, of the wired interfaces 186c, 188c, 190c. The retraction mechanisms are arranged inside the housing unit 12c and are therefore not visible in FIG. 10. Alternatively, it is conceivable for the different electromechanical interfaces 184c, 186c, 188c, 190c to be arranged in the manner of a carousel. The interface unit 14c could be mounted on the housing unit 12c so as to be able to rotate. A required electromechanical interface 184c, 186c, 188c, 190c could be transferable to a position of use by means of a rotation of the interface unit 14c.

The invention claimed is:

1. A power supply device for charging at least one electrical unit, comprising:
    at least one housing unit;
    at least one interface unit arranged on the at least one housing unit and configured to electrically couple to the at least one electrical unit; and
    at least one realtime-operating-system-compatible regulating unit located in the at least one housing unit and operably connected to the at least one electrical unit by the at least one interface unit, the at least one regulating unit configured (i) to receive non-charging related item information from the at least one electrical unit, (ii) to evaluate the received item information of the at least one electrical unit, and (iii) to independently perform actions based on the evaluation of the received item information,
    wherein the independently performed actions are performed independently of (i) an input from a user, (ii) a command from a central computing unit, and (iii) a query with a central computing unit, and
    wherein the independently performed actions include (i) generating or updating a dataset based on the evaluated item information, and (ii) providing the dataset to the at least one electrical unit.

2. The power supply device as claimed in claim 1, further comprising:
    at least one wireless communication unit, arranged at a fixed location on the at least one housing unit and operably connected to the at least one regulating unit, the at least one wireless communication unit configured to set up the at least one regulating unit for a bidirectional realtime-independent data interchange with the at least one electrical unit.

3. The power supply device as claimed in claim 1, further comprising:
    at least one wireless communication unit,
    wherein the at least one interface unit includes an inductive interface unit that forms at least part of the at least one wireless communication unit.

4. The power supply device as claimed in claim 1, wherein:
    the at least one interface unit includes a multifunctional interface unit configured to electromechanically couple to the at least one electrical unit, and
    the at least one electrical unit includes a plurality of different electrical units.

5. The power supply device as claimed in claim 1, wherein:
    the at least one electrical unit includes a battery pack that is charged by the power supply device, and
    the regulating unit is multitasking compatible.

6. The power supply device as claimed in claim 1, wherein the independently performed actions further include (i) triggering an alarm based on the evaluated item information, (ii) adapting a data transmission time interval between the regulating unit and at least one component connected to the regulating unit, and (iii) outputting advice to a user.

7. The power supply device as claimed in claim 1, further comprising:
    at least one internal sensor unit located within the at least one housing unit, the at least one internal sensor unit configured to capture surroundings parameters,
    wherein the at least one regulating unit is further configured to (i) perform the independent actions based on the captured surroundings parameters, or (ii) to evaluate the item information based on the captured surroundings parameters,
    wherein the surroundings parameters include at least one of a temperature, an orientation, an acceleration, a magnetic field, a humidity, an air pressure, and a navigation satellite signal.

8. The power supply device as claimed in claim 7, further comprising:
    at least one connection unit configured to connect at least one external sensor unit to the at least one regulating unit for data transmission purposes.

9. The power supply device as claimed in claim 8, wherein the at least one connection unit is connectable in series for electromechanically connecting a plurality of external sensor units to the at least one regulating unit.

10. The power supply device as claimed in claim 8, wherein the at least one regulating unit is configured to combine and evaluate the captured surroundings parameters with the received item information of the at least one electrical unit.

11. The power supply device as claimed in claim 10, wherein:
the dataset generated by the at least one regulating unit is at least one operating-behavior-specific dataset that is generated based on the surroundings parameters and the received item of information, and
the at least one regulating unit is configured to provide the at least one operating-behavior-specific dataset to the at least one electrical unit.

12. A power supply system comprising:
at least one electrical unit including at least one computing unit; and
at least one power supply device configured to charge the at least one electrical unit, the at least one power supply device including at least one housing unit, at least one interface unit arranged on the housing unit and configured to electrically couple to the at least one electrical unit, and at least one realtime-operating-system-compatible regulating unit located in the at least one housing unit and operably connected to the at least one electrical unit by the at least one interface unit, the at least one regulating unit configured (i) to receive non-charging related item information from the at least one electrical unit, (ii) to evaluate the received item information of the at least one electrical unit, and (iii) to independently perform actions based on the evaluation of the received item information,
wherein the independently performed actions are performed independently of (i) an input from a user, (ii) a command from at least one central computing unit, and (iii) a query with a central computing unit,
wherein the independently performed actions include (i) generating or updating a dataset based on the evaluated item information, and (ii) providing the dataset to the at least one electrical unit, and
wherein the at least one computing unit is configured to carry out a plausibility check on the dataset received from the at least one power supply device.

13. The power supply system as claimed in claim 12, wherein the item information comprises (i) at least one identification parameter that is specific to the at least one electrical unit, and (ii) at least one message number.

14. The power supply system as claimed in claim 12, wherein the at least one power supply device further comprises at least one locking unit configured to fix the at least one electrical unit to the at least one interface unit in an at least substantially theft-proof fashion.

15. The power supply system as claimed in claim 12, wherein:
the at least one central computing unit is operably connected to the at least one power supply device, the at least one central computing unit configured to provide the at least one power supply device with at least one update dataset for the at least one electrical unit,
wherein the at least one update dataset comprises at least one subject parameter and at least one message number, and
wherein the independently performed actions further include providing the update dataset to the at least one electrical unit.

16. A method for operating a power supply system including at least one power supply device for charging at least one electrical unit, comprising:
checking a technical compatibility of the at least one electrical unit with at least one dataset to be transmitted to the at least one electrical unit using the at least one power supply device; and
carrying out a plausibility check on the transmitted at least one dataset with at least one computing unit of the at least one electrical unit,
wherein the at least one power supply device includes at least one housing unit, at least one interface unit arranged on the housing unit and configured to electrically couple to the at least one electrical unit, and at least one realtime-operating-system-compatible regulating unit located in the at least one housing unit,
wherein the at least one regulating unit is configured to (i) receive non-charging related item information from the at least one electrical unit, (ii) to evaluate the received item information of the at least one electrical unit, and (iii) to independently perform actions based on the evaluation of the received item information,
wherein the independently performed actions are performed independently of (i) an input from a user, (ii) a command from a central computing unit, and (iii) a query with a central computing unit, and
wherein the independently performed actions include (i) generating or updating the at least one dataset based on the evaluated item information, and (ii) transmitting the at least one dataset to the at least one electrical unit.

17. The method as claimed in claim 16, further comprising:
ascertaining a probable end of life of the at least one electrical unit based on the evaluation of the received item information, and
offering a user at least one replacement service for the at least one electrical unit based on the evaluation of the received item information and the ascertained probable end of life.

18. The method as claimed in claim 16, further comprising:
creating at least one statement of usage costs of the at least one electrical unit based on the evaluation of the received item information.

19. The method as claimed in claim 16, further comprising:
automatically erasing duplicates of the at least one dataset that exceed a maximum term.

* * * * *